United States Patent
Itano et al.

(10) Patent No.: US 10,150,895 B2
(45) Date of Patent: Dec. 11, 2018

(54) CURABLE COMPOSITION

(71) Applicant: Kaneka Corporation, Osaka (JP)

(72) Inventors: Yu Itano, Hyogo (JP); Wendy Smits, Westerlo-Oevel (BE)

(73) Assignee: KANEKA CORPORATION, Osaka (JP)

( * ) Notice: Subject to any disclaimer, the term of this patent is extended or adjusted under 35 U.S.C. 154(b) by 189 days.

(21) Appl. No.: 15/113,693

(22) PCT Filed: Jan. 20, 2015

(86) PCT No.: PCT/JP2015/051397
§ 371 (c)(1),
(2) Date: Jul. 22, 2016

(87) PCT Pub. No.: WO2015/111577
PCT Pub. Date: Jul. 30, 2015

(65) Prior Publication Data
US 2017/0009113 A1    Jan. 12, 2017

(30) Foreign Application Priority Data

Jan. 23, 2014  (JP) ................................ 2014-010525

(51) Int. Cl.
| | |
|---|---|
| *C09J 133/12* | (2006.01) |
| *C09J 11/04* | (2006.01) |
| *C09J 201/10* | (2006.01) |
| *C09J 171/02* | (2006.01) |
| *C08K 9/06* | (2006.01) |
| *C08K 3/34* | (2006.01) |
| *C08L 101/10* | (2006.01) |

(52) U.S. Cl.
CPC ............... *C09J 133/12* (2013.01); *C08K 3/34* (2013.01); *C08K 3/346* (2013.01); *C08K 9/06* (2013.01); *C08L 101/10* (2013.01); *C09J 11/04* (2013.01); *C09J 171/02* (2013.01); *C09J 201/10* (2013.01)

(58) Field of Classification Search
None
See application file for complete search history.

(56) References Cited

U.S. PATENT DOCUMENTS

| | | | | |
|---|---|---|---|---|
| 5,705,541 A | * | 1/1998 | Awe .................. | C08K 3/34 523/220 |
| 2007/0112145 A1 | * | 5/2007 | Ando ................. | C08G 59/50 525/476 |
| 2012/0308838 A1 | | 12/2012 | Ito et al. | |
| 2014/0094553 A1 | | 4/2014 | Fujimoto et al. | |

FOREIGN PATENT DOCUMENTS

| | | |
|---|---|---|
| EP | 120833 A1 | 10/1984 |
| EP | 2684690 A1 | 1/2014 |
| JP | H0627666 A | 2/1994 |
| JP | 2000109732 A | 4/2000 |
| JP | 2002020548 A | 1/2002 |
| JP | 2003105307 A | 4/2003 |
| JP | 2005206654 A | 8/2005 |
| JP | 2006264126 A | 10/2006 |
| WO | 2011096206 A1 | 8/2011 |
| WO | 2012/117902 A1 | 9/2012 |
| WO | 2012121288 A1 | 9/2012 |

OTHER PUBLICATIONS

Office Action issued in Chinese Application No. 201580011769.6 dated May 27, 2017 (3 pages).
International Search Report dated Apr. 28, 2015, issued in corresponding International Patent Application No. PCT/JP2015/051397, with English translation (5 pages).
Written Opinion of the International Searching Authority dated Apr. 28, 2015, issued in corresponding International Patent Application No. PCT/JP2015/051397, with English translation (7 pages).
International Search Report issued in corresponding application No. PCT/JP2015/051397 dated Apr. 28, 2015 (4 pages).
Written Opinion of the International Searching Authority issued in corresponding application No. PCT/JP2015/051397 dated Apr. 28, 2015 (3 pages).

* cited by examiner

*Primary Examiner* — Sheeba Ahmed
(74) *Attorney, Agent, or Firm* — Osha Liang LLP

(57) ABSTRACT

A curable composition includes an organic polymer containing a reactive silicon group (A), and a bound substance of kaolinite and quartz (B) at a proportion of 30-200 parts by weight relative to 100 parts by weight of the organic polymer containing a reactive silicon group (A).

15 Claims, No Drawings

CURABLE COMPOSITION

TECHNICAL FIELD

The present invention relates to a curable composition containing an organic polymer having a silicon-containing group which has a hydroxyl group or hydrolyzable group bonded to a silicon atom, and is capable of forming a siloxane bond (such silicon-containing group is generally referred to as a "reactive silicon group" or a "hydrolyzable silyl group").

BACKGROUND

It is known that an organic polymer containing at least one reactive silicon group in a molecule is crosslinked by the formation of a siloxane bond, which is accompanied by hydrolysis and the like of a silyl group due to moisture and the like even at room temperature, to give a rubbery cured product.

As an organic polymer having such reactive silicon group (hydrolyzable silyl group), an organic polymer having a polyoxyalkylene polymer, a polyisobutylene polymer or a poly(meth)acrylate-based polymer as a main chain skeleton has already been industrially produced and widely used for applications such as sealing material, adhesive, paint and the like. Particularly, an organic polymer containing a reactive silicon group (hydrolyzable silyl group) is widely used in the fields of sealing material, adhesive and the like, since it shows good workability, adhesiveness, extensibility and the like. However, its adhesiveness to low polar substrates such as polyethylene, polypropylene and the like, and porous substrates such as concrete, wood and the like, and the like is not sufficient, and a further improvement is desired. Particularly, in the field of woodworking adhesive, since conventionally-used urethane-based adhesives contain an isocyanate group that possibly exerts an adverse influence on the human body, there is a strong demand for substitution with an environmentally compatible material, and there are also unsatisfactory levels of water-resistant adhesiveness.

While patent document 1 reports that a cured product superior in the strength and water-resistant adhesiveness is afforded by the use of a curable composition containing an organic polymer containing a reactive silicon group, and an epoxy resin, epoxy resin is feared to exert an adverse influence on the human body and is not a complete environmentally compatible material.

DOCUMENT LIST

Patent Document patent document 1: WO 2012/121288

SUMMARY OF THE INVENTION

Accordingly, one or more embodiments of the present invention provide a curable composition containing a reactive silicon group, which has high environmental compatibility and can provide a cured product having high water-resistant adhesiveness.

One or more embodiments of the present invention provide a curable composition containing a reactive silicon group, which has high environmental compatibility and can provide a cured product having high strength and high water-resistant adhesiveness.

The present inventors have found that a composition containing at least an organic polymer containing a reactive silicon group and a bound substance of kaolinite and quartz can provide a cured product having a sufficiently high water-resistant adhesiveness.

Accordingly, one or more embodiments of the present invention provide the following.

[1] A curable composition comprising
an organic polymer containing a reactive silicon group (A), and
a bound substance of kaolinite and quartz (B).

[2] The curable composition of the above-mentioned [1], wherein the organic polymer containing a reactive silicon group (A) comprises a reactive silicon group-containing polyoxyalkylene-based polymer (A1) and/or a reactive silicon group-containing (meth)acrylate-based polymer (A2).

[3] The curable composition of the above-mentioned [1], wherein the organic polymer containing a reactive silicon group (A) comprises a polyoxyalkylene-based polymer (a1) and/or a (meth)acrylate-based polymer (a2) as a main chain.

[4] The curable composition of any one of the above-mentioned [1]-[3], wherein the bound substance of kaolinite and quartz (B) is contained in the curable composition at a proportion of 30-200 parts by weight relative to 100 parts by weight of the component (A).

[5] The curable composition of any one of the above-mentioned [1]-[4], wherein the bound substance of kaolinite and quartz (B) has a kaolinite content of not more than 15 wt %.

[6] The curable composition of any one of the above-mentioned [1]-[5], wherein the bound substance of kaolinite and quartz (B) has a $D_{50}$ particle size of 1-3 μm.

[7] The curable composition of any one of the above-mentioned [1]-[6], wherein the bound substance of kaolinite and quartz (B) is calcined.

[8] The curable composition of any one of the above-mentioned [1]-[7], wherein the bound substance of kaolinite and quartz (B) is surface-treated.

[9] The curable composition of any one of the above-mentioned [1]-[8], further comprising an epoxy group-containing silane coupling agent (C) and an amidine compound (D).

[10] The curable composition of any one of the above-mentioned [1]-[9], further comprising an organotin-based compound.

[11] An adhesive comprising the curable composition of any one of the above-mentioned [1]-[10].

[12] A cured product obtained by curing the curable composition of any one of the above-mentioned [1]-[10].

[13] An adhered structure of wood and a cured product obtained by curing the curable composition of any one of the above-mentioned [1]-[10].

The curable composition of one or more embodiments of the present invention has high environmental compatibility, cures at room temperature and provides a cured product that becomes a cured product having high water-resistant adhesiveness, preferably, a cured product having high strength and high water-resistant adhesiveness.

DESCRIPTION OF EMBODIMENTS

The present invention is explained in detail in the following.

The curable composition of one or more embodiments of the present invention (hereinafter to be also abbreviated as "the composition of the present invention") is mainly characterized in that it contains an organic polymer containing a reactive silicon group (A), and a bound substance of kaolinite and quartz (B).

An organic polymer containing a reactive silicon group (hereinafter to be also referred to as "polymer (A)"), which is component (A) in the composition of the present invention, is not particularly limited, and an organic polymer whose main chain skeleton is polyoxyalkylene-based polymer, (meth)acrylate-based polymer, saturated hydrocarbon-based polymer, polyester-based polymer or the like can be used. Of these, one containing a polyoxyalkylene-based polymer as the main chain skeleton (i.e., "reactive silicon group-containing polyoxyalkylene-based polymer (A1)"), and one containing a (meth)acrylate-based polymer as the main chain skeleton (i.e., "reactive silicon group-containing (meth)acrylate-based polymer (A2)") are preferable, since they show low temperature property, flexibility, and good compatibility to other components, and particularly preferred is an organic polymer containing a blend of these two reactive silicon group-containing polymers. In the following explanations, these two polymers are described as representative examples.

In one or more embodiments of the present invention, the "reactive silicon group" in polymer (A) is a silicon-containing group having a hydroxyl group or a hydrolyzable group bonded to a silicon atom, and capable of forming a siloxane bond, and is preferably a reactive silicon group represented by the following formula (1):

$$—SiR^1_aX_{3-a} \quad (1)$$

wherein $R^1$ is a substituted or unsubstituted hydrocarbon group having 1-20 carbon atoms, each X is independently a hydroxyl group or a hydrolyzable group, and a is 0 or 1.

A reactive silicon group represented by the formula (1) is a group crosslinkable by forming a siloxane bond by a reaction accelerated by a catalyst for silanol condensation.

Examples of $R^1$ in the formula (1) include alkyl groups such as methyl group, ethyl group and the like; cycloalkyl groups such as cyclohexyl group and the like; aryl groups such as phenyl group and the like; aralkyl groups such as benzyl group and the like; a triorganosiloxy group represented by —OSi(R')$_3$ wherein R' is methyl group, phenyl group and the like; fluoroalkyl groups such as fluoromethyl group, difluoromethyl group and the like; chloroalkyl groups such as chloromethyl group, 1-chloroethyl group and the like; alkoxyalkyl groups such as methoxymethyl group, ethoxymethyl group, phenoxymethyl group, 1-methoxyethyl group and the like; aminoalkyl groups such as aminomethyl group, N-methylaminomethyl group, N,N-dimethylaminomethyl group and the like; acetoxymethyl group, methylcarbamate group, 2-cyanoethyl group and the like. Of these, alkyl group is preferable, and methyl group is particularly preferable, due to the availability of the starting material.

As a hydrolyzable group for X in the formula (1), a known hydrolyzable group can be mentioned. Examples of the hydrolyzable group include a hydrogen, a halogen, an alkoxy group, an alkenyloxy group, an aryloxy group, an acyloxy group, a ketoxymate group, an amino group, an amido group, an acid amido group, an aminooxy group, a mercapto group and the like. Of these, a halogen, an alkoxy group, an alkenyloxy group, and an acyloxy group are preferable since the activity is high, an alkoxy group is more preferable since it shows mild hydrolyzability and is easy to handle, and a methoxy group and an ethoxy group are particularly preferable. From the aspect of safety, therefore, an ethoxy group and an isopropenoxy group are preferable, since the compound that leaves due to the reaction is ethanol and acetone, respectively.

As the substituted or unsubstituted hydrocarbon group X having 1-20 carbon atoms for $R^1$ in the formula (1), an alkyl group having 1-10 carbon atoms, an aryl group having 6-10 carbon atoms or an aralkyl group having 7-10 carbon atoms is preferable, and these may be bonded to halogen atom, nitro group, amino group, cyano group or hydroxyl group as a substituent. From the aspect of synthesis, an alkyl group having 1-10 carbon atoms is preferable, and methyl group and ethyl group are particularly preferable.

As a reactive silicon group represented by the formula (1), trimethoxysilyl group, triethoxysilyl group, tris(2-propenyloxy)silyl group, triacetoxysilyl group, dimethoxymethylsilyl group, diethoxymethylsilyl group, diisopropoxymethylsilyl group, (chloromethyl)dimethoxysilyl group, (methoxymethyl)dimethoxysilyl group, (methoxymethyl)diethoxysilyl group, and (ethoxymethyl)dimethoxysilyl group are specifically preferable. Of these, dimethoxymethylsilyl group and trimethoxysilyl group are preferable since a cured product having high strength can be obtained.

[Reactive Silicon Group-Containing Polyoxyalkylene-Based Polymer (A1)]

In polymer (A), one wherein the main chain skeleton is a polyoxyalkylene-based polymer, i.e., reactive silicon group-containing polyoxyalkylene-based polymer (A1) shows a comparatively low glass transition temperature of polyoxyalkylene-based polymer (a1) as the main chain skeleton. Therefore, by using reactive silicon group-containing polyoxyalkylene-based polymer (A1) as component (A), superior cold resistance can be imparted to a cured product obtained from the composition of the present invention. In addition, since polyoxyalkylene-based polymer (a1) has high moisture permeability, when the composition of the present invention is a one-component composition, superior depth curability can be afforded and the adhesiveness of the cured product becomes characteristically superior.

The polyoxyalkylene-based polymer (a1) is specifically, for example, polyoxyethylene, polyoxypropylene, polyoxybutylene, polyoxytetramethylene, polyoxyethylene-polyoxypropylene copolymer, polyoxypropylene-polyoxybutylene copolymer and the like.

The main chain structure of the polyoxyalkylene-based polymer may be composed of only one kind of repeat unit, or two or more kinds of repeat units. Particularly, when the curable composition of one or more embodiments of the present invention is used for sealant, adhesive and the like, one composed of an oxypropylene-based polymer containing not less than 50 wt %, preferably not less than 80 wt %, of the oxypropylene repeat unit in the polymer main chain structure is preferable, since it is amorphous and comparatively low viscous.

The main chain structure of the polyoxyalkylene-based polymer (a1) may be linear or have a branched chain. When a cured product with higher strength is desired, a branched chain polymer is preferable. When a cured product with higher elongation is desired, a linear polymer is preferable. When the polymer has a branched chain, the branched chain number is preferably 1-4, most preferably 1.

In one or more embodiments, the main chain structure of polyoxyalkylene-based polymer (a1) optionally has a polymer structure other than the oxyalkylene structure.

As polyoxyalkylene-based polymer (a1), one obtained by a known method can be used, and one produced by ring opening polymerization reaction of a cyclic ether compound, by using a polymerization catalyst in the presence an initiator, is preferable.

Examples of the cyclic ether compound include ethylene oxide, propylene oxide, butylene oxide, tetramethylene oxide, tetrahydrofuran and the like. Only one kind of these cyclic ether compounds may be used, or two or more kinds may be used in combination. Of these cyclic ether compounds, propylene oxide is particularly preferably used since amorphous polyether polymer having comparatively low viscosity can be obtained.

Specific examples of the initiator include alcohols such as ethylene glycol, propylene glycol, butanediol, hexamethylene glycol, neopentyl glycol, diethylene glycol, dipropylene glycol, triethylene glycol, glycerol, trimethylolmethane, trimethylolpropane, pentaerythritol, sorbitol and the like; polyoxyalkylene-based polymer (preferably, polymer having a number average molecular weight of 300-4,000) such as polyoxypropylene diol, polyoxypropylene triol, polyoxyethylene diol, polyoxyethylene triol and the like, and the like.

While the synthesis method of polyoxyalkylene-based polymer (a1) is not particularly limited, examples thereof include a polymerization method using an alkali catalyst such as KOH, a polymerization method using a transition metal compound-porphyrin complex catalyst such as a complex obtained by reacting an organic aluminum compound and porphyrin as shown in JP-A-61-215623, a polymerization method using a double metal cyanide complex catalyst as shown in JP-B-46-27250, JP-B-59-15336, U.S. Pat. No. 3,278,457, U.S. Pat. No. 3,278,458, U.S. Pat. No. 3,278,459, U.S. Pat. No. 3,427,256, U.S. Pat. No. 3,427,334, U.S. Pat. No. 3,427,335 and the like, a polymerization method using a catalyst comprising a polyphosphagen salt shown in JP-A-10-273512, a polymerization method using a catalyst comprising a phosphagen compound shown in JP-A-11-060722 and the like. A polymerization method using a double metal cyanide catalyst is more preferable for reasons of production cost, a polymer with narrow molecular weight distribution to be obtained and the like.

While the molecular weight distribution (Mw/Mn) of the polymer is not particularly limited, it is preferably narrow, and preferably less than 2.0, more preferably not more than 1.6, further preferably not more than 1.5, and particularly preferably not more than 1.4.

The number average molecular weight based on polystyrene of the polymer by GPC is preferably not less than 8,000, more preferably not less than 9,000, particularly preferably not less than 10,000. It is preferably not more than 50,000, more preferably not more than 35,000, particularly preferably not more than 30,000. When the number average molecular weight of the polymer is small, the viscosity becomes low to improve workability during use of a curable composition. On the other hand, the obtained cured product tends to be hard and the elongation property tends to be degraded. When the molecular weight becomes too high, the concentration of the reactive silicon group becomes too low, and the curing rate may become slow. In addition, the viscosity tends to become high and the handling tends to be difficult.

A method of introducing a reactive silicon group is not particularly limited, and a known method can be utilized. Examples of the introduction method are shown below.

(i) Hydrosilylation

A method including introducing an unsaturated bond into a polymer to be the starting material (hereinafter to be also indicated as "prepolymer"), and adding a hydrosilane compound to the unsaturated bond by a hydrosilylation reaction can be mentioned. An introduction method of the unsaturated bond may be any. For example, a method including reacting a prepolymer having a functional group such as hydroxy group and the like with a compound having a group that reacts with the functional group and an unsaturated bond to give a polymer containing an unsaturated bond; a method including copolymerization of a polymerizable monomer having an unsaturated bond; and the like can be mentioned.

(ii) Reaction of Reactive Group-Containing Polymer (Prepolymer) and Silane Coupling Agent A method including reacting a prepolymer having a reactive group such as hydroxy group, amino group, unsaturated bond and the like with a compound having both a group that reacts with a reactive group of the prepolymer to form a bond and a reactive silicon group (also called silane coupling agent) can be mentioned. Examples of the combination of a reactive group of a prepolymer and a reactive group of a silane coupling agent include, but are not limited to, a hydroxy group and an isocyanate group, a hydroxy group and an epoxy group, an amino group and an isocyanate group, an amino group and a thioisocyanate group, an amino group and an epoxy group, Michael addition of an amino group and an acrylic structure, a carboxy group and an epoxy group, an unsaturated bond and a mercapto group and the like.

The method of the above-mentioned (i) is preferable since the reaction is convenient, the amount of the reactive silicon group to be introduced can be adjusted, and the property of the obtained reactive silicon group-containing polymer is stable. The method of the above-mentioned (ii) is preferable since it has many alternatives of the reaction and the introduction rate of the reactive silicon group can be increased easily.

Examples of the hydrosilane compound usable in the method of (i) include halogenated silanes such as trichlorosilane, dichloromethylsilane, dichlorophenylsilane, (methoxymethyl)dichlorosilane and the like; alkoxysilanes such as dimethoxymethylsilane, diethoxymethylsilane, trimethoxysilane, triethoxysilane, (chloromethyl)dimethoxysilane, (methoxymethyl)dimethoxysilane and the like; isopropenyloxysilanes (deacetone type) such as triisopropenyloxysilane, (chloromethyl)diisopropenyloxysilane, (methoxymethyl)diisopropenyloxysilane and the like, and the like.

A silane coupling agent that can be used in the method of (ii) includes the following compounds.

The silane coupling agent that reacts with an unsaturated bond includes mercaptosilanes such as 3-mercaptopropyltrimethoxysilane, 3-mercaptopropyldimethoxymethylsilane, 3-mercaptopropyltriethoxysilane, mercaptomethyltriethoxysilane, mercaptomethyldimethoxymethylsilane and the like. The silane coupling agent that reacts with a hydroxyl group includes isocyanate silanes such as 3-isocyanatepropyltrimethoxysilane, 3-isocyanatepropyldimethoxymethylsilane, 3-isocyanatepropyltriethoxysilane, isocyanatemethyltrimethoxysilane, isocyanatemethyltriethoxysilane, isocyanatemethyldimethoxymethylsilane and the like. The silane coupling agent that reacts with hydroxyl group, amino group, carboxylic acid group and the like includes epoxy silanes such as 3-glycidoxypropyltrimethoxysilane, 3-glycidoxypropyldimethoxymethylsilane, 3-glycidoxypropyltriethoxysilane, glycidoxymethyltrimethoxysilane, glycidoxymethyltriethoxysilane, glycidoxymethyldimethoxymethylsilane and the like. The silane coupling agent that reacts with isocyanate group, thioisocyanate group and the like includes aminosilanes such as 3-aminopropyltrimethoxysilane, 3-aminopropyldimethoxymethylsilane, 3-aminopropyltriethoxysilane, 3-(2-aminoethyl)propyltrimethoxysilane, 3-(2-aminoethyl)propyldimethoxymethylsilane, 3-(2-aminoethyl)propyltriethoxysilane, 3-(N-ethylamino)-2-methylpropyltrimethoxysilane, 3-ureidopropyltrimethoxysilane, 3-ureidopropyltriethoxysilane, N-phenyl-3-aminopropyltrimethoxysilane, N-benzyl-3-aminopropyltrimethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, N,N'-bis[3-(trimethoxysilyl)propyl]ethylenediamine, bis(3-(trimethoxysilyl)propyl)amine and the like, hydroxyalkylsilanes such as 3-hydroxypropyltrimethoxysilane, hydroxymethyltriethoxysilane and the like, and the like. The above-mentioned silane coupling agents are of one embodiment and a silyl group can be introduced utilizing or applying a similar reaction.

In one or more embodiments, other components such as urethane bond component and the like may be contained in the main chain structure of polyoxyalkylene-based polymer (a1). The urethane bond component is not particularly limited, and a group produced by a reaction of an isocyanate group and an active hydrogen group (hereinafter to be also referred to as an amido segment) can be mentioned.

A cured product obtained by curing a curable composition containing a polymer having a urethane bond in the main chain sometimes provides effects of high hardness and high strength due to the action of a hydrogen bond and the like. On the other hand, a urethane bond may be cleaved due to the heat and the like. To impart such property to one or more embodiments of the curable composition of the present invention, an amido segment may be introduced into the polymer or the amido segment may be intentionally eliminated. A polyoxyalkylene-based polymer having an amido segment tends to show high viscosity. A polyoxyalkylene-based polymer having an amido segment sometimes shows improved curability.

The above-mentioned amido segment is a group represented by the formula (2):

$$-NR^2-C(=O)- \qquad (2)$$

wherein $R^2$ is an organic group having 1-10 carbon atoms or a hydrogen atom.

The aforementioned amido segment specifically includes a urethane group produced by a reaction of an isocyanate group and a hydroxy group, or an amino group and carbonate; a urea group produced by a reaction of an isocyanate group and an amino group; a thiourethane group produced by a reaction of an isocyanate group and a mercapto group and the like. In one or more embodiments of the present invention, moreover, a group produced by a further reaction of active hydrogen in the above-mentioned urethane group, urea group, and thiourethane group, and an isocyanate group is also encompassed in the group of the formula (2).

Examples of the industrially feasible production method of a polyoxyalkylene-based polymer having an amido segment and a reactive silicon group include a method comprising reacting a polyoxyalkylene-based polymer having an active hydrogen-containing group on the terminal with an excess polyisocyanate compound to give a polymer having an isocyanate group on the terminal of the polyurethane-based main chain, and thereafter or simultaneously therewith, reacting a part or whole of the isocyanate group with a Z group of a silicon compound represented by the formula (3):

$$Z-R^3-SiR^1_aX_{3-a} \qquad (3)$$

wherein $R^1$, X and a are as defined above, $R^3$ is a divalent organic group, and Z is an active hydrogen-containing group selected from a hydroxy group, a carboxy group, a mercapto group and an amino group (primary or secondary). The divalent organic group for $R^3$ in the formula (3) is preferably a divalent hydrocarbon group having 1-20 carbon atoms.

In addition, one produced by reacting a polyoxyalkylene-based polymer having an active hydrogen-containing group on the terminal with a reactive silicon group-containing isocyanate compound represented by the formula (4):

$$O=C=N-R^3-SiR^1_aX_{3-a} \qquad (4)$$

wherein $R^3$, $R^1$, X and a are as defined above, can be mentioned.

While the silicon compound of the formula (3) is not particularly limited, specific examples thereof include amino group-containing silanes such as γ-aminopropyldimethoxymethylsilane, γ-aminopropyltrimethoxysilane, N-(β-aminoethyl)-γ-aminopropyltrimethoxysilane, N-(β-aminoethyl)-γ-aminopropyldimethoxymethylsilane, (N-phenyl)-γ-aminopropyltrimethoxysilane, N-ethylaminoisobutyltrimethoxysilane, and the like; hydroxy group-containing silanes such as γ-hydroxypropyltrimethoxysilane and the like; mercapto group-containing silanes such as γ-mercaptopropyltrimethoxysilane, mercaptomethyltriethoxysilane and the like; and the like. Moreover, as described in JP-A-6-211879 (U.S. Pat. No. 5,364,955), JP-A-10-53637 (U.S. Pat. No. 5,756,751), JP-A-10-204144 (EP0831108), JP-A-2000-169544 and JP-A-2000-169545, Michael addition reaction product of various α,β-unsaturated carbonyl compounds and primary amino group-containing silane, and a Michael addition reaction product of various (meth)acryloyl group-containing silanes and a primary amino group-containing compound can also be used as the silicon compound represented by the formula (3).

While the reactive silicon group-containing isocyanate compound of the formula (4) is not particularly limited, specific examples thereof include γ-trimethoxysilylpropyl isocyanate, γ-triethoxysilylpropyl isocyanate, γ-methyldimethoxysilylpropyl isocyanate, γ-methyldiethoxysilylpropylisocyanate, γ-(methoxymethyl)dimethoxysilylpropylisocyanate, trimethoxysilylmethyl isocyanate, triethoxymethylsilylmethyl isocyanate, dimethoxymethylsilylmethyl isocyanate, diethoxymethylsilylmethyl isocyanate, (methoxymethyl)dimethoxysilylmethylisocyanate and the like.

When the main chain structure of polyoxyalkylene-based polymer (a1) contains an amido segment, the number on average of the amido segment per 1 molecule is preferably 1-10, more preferably 1.5-5, particularly preferably 2-3. When it is less than 1, curability may not be sufficient, and when it is larger than 10, the polymer has high viscosity and handling may become difficult. To lower the viscosity of the curable composition and improve workability, the polymer is preferably substantially free of an amido segment.

Polyoxyalkylene-based polymer (a1) may have, on average, more than one reactive silicon group in one terminal portion. Generally, when a reactive silicon group is introduced by the method of the above-mentioned (i), the reactive silicon group is limited to not more than 1 on average on one terminal portion. In contrast, more than one reactive silicon group can be introduced into one terminal portion by reacting a prepolymer with an epoxy compound having a carbon-carbon unsaturated bond, and further modifying an alcohol terminal into an unsaturated group.

As an epoxy compound having a carbon-carbon unsaturated bond, (meth)allyl glycidyl ether, glycidyl (meth)acrylate, butadiene monooxide, 1,4-cyclopentadiene monoepoxide are specifically preferable from the aspect of reaction activity, and allyl glycidyl ether is particularly preferable. In the present invention, (meth)allyl means allyl and/or methallyl.

As the amount of the epoxy compound having a carbon-carbon unsaturated bond to be added, any amount can be determined in consideration of the amount and reactivity of the carbon-carbon unsaturated bond to be introduced into the polyoxyalkylene-based polymer. Particularly, the molar ratio to the hydroxyl group contained in the polyoxyalkylene-based polymer is preferably not less than 0.2, more preferably not less than 0.5. It is preferably not more than 5.0, more preferably not more than 2.0.

The reaction temperature of the ring opening addition reaction of a prepolymer and an epoxy compound having a carbon-carbon unsaturated bond is preferably not less than 60° C. and not more than 150° C., more preferably not less than 110° C. and not more than 140° C. When it is low, the reaction scarcely proceeds, and when it is too high, the main chain of the polyoxyalkylene-based polymer may be decomposed.

In the structure of a polymer having an unsaturated bond and before introduction of a reactive silicon group, which is obtained by the above-mentioned method, the terminal portion has a structure represented by the formula (5):

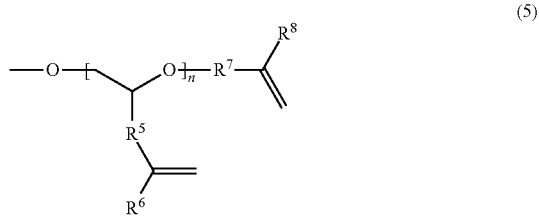

(5)

wherein $R^5$ and $R^7$ are each independently a divalent organic group, an atom that binds to the adjacent each carbon atom is any of carbon, oxygen and nitrogen, $R^6$ and $R^8$ are each independently hydrogen or a hydrocarbon group having 1-10 carbon atoms, and n is an integer of 1-10.

The number of the terminal structure having a reactive silicon group contained in 1 molecule of polyoxyalkylene-based polymer (a1) is preferably not less than 0.5, more preferably not less than 1.0, further preferably not less than 1.1, most preferably not less than 1.5, on average.

The average number of the reactive silicon group per 1 molecule of polyoxyalkylene-based polymer (a1) is preferably not less than 1.2, more preferably not less than 1.3, most preferably not less than 1.5. In addition, not more than 6.0 is preferable, not more than 5.5 is more preferable, and not more than 5.0 is most preferable. The number of the reactive silicon groups of not more than 1.2 is not preferable since a cured product with high strength may not be obtained. The number of the reactive silicon groups not less than 6.0 is not preferable since a cured product with high elongation may not be obtained.

The average number of the reactive silicon groups of polyoxyalkylene-based polymer (a1) is defined to be an average number obtained by quantification of protons on carbon directly bonded to a reactive silicon group by high resolution $^1$H-NMR method. In the calculation of the average number of the reactive silicon groups in the polymer of the present invention, a prepolymer into which a reactive silicon group was not introduced and a polymer obtained by side reaction, into which a reactive silicon group was not introduced, during introduction of a reactive silicon group into a prepolymer, are considered to partly form components of the polymer having the same main chain structure and included in the parameter (molecule number) of calculation of the average number of the reactive silicon groups in one molecule.

In one or more embodiments of the present invention, one or more kinds of reactive silicon group-containing polyoxyalkylene-based polymer (A1) can be used.

[Reactive Silicon Group-Containing (Meth)Acrylate-Based Polymer (A2)]

In polymer (A), one wherein the main chain skeleton is a (meth)acrylate-based polymer, i.e., (meth)acrylate-based polymer (a2) as the main chain skeleton of reactive silicon group-containing (meth)acrylate-based polymer (A2) is a polymer having an alkyl acrylate monomer unit and/or an alkyl methacrylate monomer unit having an alkyl group having 1-20 carbon atoms. In the present invention, "(meth)acryl" means "acryl and/or methacryl".

Since (meth)acrylate-based polymer (a2) has the main chain skeleton constituted of a carbon-carbon bond alone and does not allow easy cleavage of the main chain due to heat or light, when reactive silicon group-containing (meth)acrylate-based polymer (A2) is used as component (A), the obtained cured product is characteristically superior in the heat resistance and weatherability.

As the above-mentioned alkyl acrylate monomer unit having an alkyl group having 1-20 carbon atoms, a conventionally-known ones can be used widely and, for example, methyl acrylate, ethyl acrylate, n-propyl acrylate, n-butyl acrylate, isobutyl acrylate, tert-butyl acrylate, n-hexyl acrylate, 2-ethylhexyl acrylate, decyl acrylate, undecyl acrylate, lauryl acrylate, tridecyl acrylate, myristyl acrylate, cetyl acrylate, stearyl acrylate, behenyl acrylate, biphenyl acrylate and the like can be mentioned. As the above-mentioned alkyl methacrylate monomer unit having 1-20 carbon atoms, a conventionally-known ones can be used widely and, for example, methyl methacrylate, ethyl methacrylate, n-propyl methacrylate, n-butyl methacrylate, isobutyl methacrylate, tert-butyl methacrylate, n-hexyl methacrylate, 2-ethylhexyl methacrylate, decyl methacrylate, undecyl methacrylate, lauryl methacrylate, tridecyl methacrylate, myristyl methacrylate, cetyl methacrylate, stearyl methacrylate, behenyl methacrylate, biphenyl methacrylate and the like can be mentioned. The presence of not less than 50 wt % of a alkyl (meth)acrylate monomer unit in (meth)acrylate-based polymer (a2) is preferable, and not less than 70 wt % is more preferable.

Preferably, (meth)acrylate-based polymer (a2) is an acrylic copolymer wherein the molecular chain substantially has an alkyl acrylate monomer unit and/or an alkyl methacrylate monomer unit (a2-1) having an alkyl group having 1-2 carbon atoms, and an alkyl acrylate monomer unit and/or an alkyl methacrylate monomer unit (a2-2) having an alkyl group having 7-9 carbon atoms. Since an acrylic copolymer having such monomer units (a2-1) and (a2-2) shows good balance of compatibility with reactive silicon group-containing polyoxyalkylene-based polymer (A1), it advantageously acts in an embodiment using, as component (A), an organic polymer containing a blend of reactive silicon group-containing (meth)acrylate-based polymer (A2) and reactive silicon group-containing polyoxyalkylene-based polymer (A1).

When such monomer unit (a2-1) and monomer unit (a2-2) are present, the (meth)acrylate-based polymer as the main chain skeleton is preferably present at not less than 70 wt % of the (meth)acrylate-based polymer (A). While the mixing ratio of (a2-1) and (a2-2) is any, the weight ratio of (a2-1)/(a2-2) is preferably 40/60-90/10 in view of the balance of strength and adhesiveness. As the alkyl acrylate monomer unit and/or alkyl methacrylate monomer unit (a2-1) having an alkyl group having 1-2 carbon atoms, methyl methacrylate and methyl acrylate are preferable. As the alkyl acrylate monomer unit and/or alkyl methacrylate monomer unit (a2-2) having an alkyl group having 7-9 carbon atoms, 2-ethylhexyl acrylate and 2-ethylhexyl methacrylate are preferable.

The (meth)acrylate-based polymer (a2) may contain, besides alkyl acrylate monomer unit and/or alkyl methacrylate monomer unit, a monomer unit copolymerizable therewith. For example, (meth)acrylic acids such as acrylic acid, methacrylic acid and the like; monomers containing an amido group such as acrylamide, methacrylamide, N-methylolacrylamide, N-methylolmethacrylamide and the like, monomers containing an epoxy group such as glycidyl acrylate, glycidyl methacrylate and the like, monomers containing an amino group such as diethylaminoethylacrylate, diethylaminoethylmethacrylate, aminoethylvinylether and the like; (meth)acrylates containing a reactive silicon group other than the formula (1) such as γ-(meth)acryloxypropyldimethoxymethylsilane, γ-(meth)acryloxypropyldiethoxymethylsilane, γ-(meth)acryloxypropyldiisopropoxymethylsilane and the like; polyoxyethylene acrylate, polyoxyethylene methacrylate and the like can be mentioned. Polyoxyethylene acrylate and polyoxyethylene methacrylate are expected to provide a copolymerization effect in view of moisture curability and internal curability. Besides these, monomer units derived from acrylonitrile, styrene, α-methylstyrene, alkylvinylether, vinyl chloride, vinyl acetate, vinyl propionate, ethylene and the like, and the like can be mentioned.

While the monomer composition of (meth)acrylate-based polymer (a2) is generally selected by those of ordinary skill in the art according to the use and object, for use requiring strength one having a comparatively high glass transition temperature Tg is preferable, and one having a softening point of not less than 0° C. and not more than 200° C., more preferably not less than 20° C. and not more than 100° C. is preferable. When the softening point is less than 0° C., the strength improving effect becomes unpreferably low. The Tg is determined by the following formula of Fox.

Fox formula:

$$1/(Tg(K)) = \Sigma(Mi/Tgi)$$

wherein Mi is a weight fraction of a monomer i component constituting the polymer, and Tgi is a glass transition temperature (K) of homopolymer of monomer i.

The main chain structure of (meth)acrylate-based polymer (a2) is not particularly limited, and it may be linear or branched.

While the molecular weight of (meth)acrylate-based polymer (a2) is not particularly limited, a weight average molecular weight of 500 to 100,000 based on polystyrene by GPC is preferable from the aspect of the difficulty in polymerization. Furthermore, one having 1,000-30,000 is preferable from the balance of strength and viscosity, and one having 1,500-10,000 is preferable from the aspects of easy handling such as workability and the like and adhesiveness. When the molecular weight is too low, the cured product unpreferably tends to be brittle, and when the molecular weight is too high, the curable composition unpreferably tends to have high viscosity.

The synthesis method of (meth)acrylate-based polymer (a2) is not particularly limited, and a known method can be used. However, a polymer obtained by a general free radical polymerization method using an azo compound, peroxide and the like as a polymerization initiator is associated with molecular weight distribution values which are generally greater than 2 and high viscosity. Therefore, to obtain a (meth)acrylate-based polymer having a narrow molecular weight distribution, low viscosity, and a crosslinking functional group at a high ratio on the molecular chain terminal, a living radical polymerization method is preferably used.

Of the "living radical polymerization method", an "atom transfer radical polymerization" including polymerizing a (meth)acrylate-based monomer by using an initiator such as organic halide, a halogenated sulfonyl compound or the like, and a transition metal complex as a catalyst is more preferable as a production method of a (meth)acrylate-based polymer having a particular functional group, since it has, in addition to the characteristics of the above-mentioned "living radical polymerization method", a halogen and the like comparatively advantageous for the functional group conversion reaction on the terminal and a high degree of freedom in the design of initiator and catalyst. The atom transfer radical polymerization is described in, for example, Matyjaszewski et al., Journal of the American Chemical Society (J. Am. Chem. Soc.) 1995, vol. 117, page 5614 and the like.

Examples of the production method (meth)acrylate-based polymer having a reactive silicon group include production methods using a free radical polymerization method using a chain transfer agent, which are disclosed in JP-B-3-14068, JP-B-4-55444, JP-A-6-211922 and the like. In addition, examples thereof include, but are not particularly limited to, production methods using an atom transfer radical polymerization disclosed in JP-A-9-272714 and the like.

As the aforementioned free radical polymerization method, a solution polymerization method by a radical reaction, a bulk polymerization method and the like can be used for polymerization; however, the method is not particularly limited to these methods. The reaction is generally performed by reaction at 50-150° C. with the addition of the aforementioned monomer and radical initiator, chain transfer agent, solvent and the like.

Examples of the aforementioned radical initiator include, azobisisobutyronitrile, benzoylperoxide and the like, and examples of the chain transfer agent include mercaptans such as n-dodecyl mercaptan, t-dodecyl mercaptan, lauryl mercaptan and the like, halogen-containing compounds and the like. As the solvent, for example, a non-reactive solvent such as ether, hydrocarbon, ester is preferably used.

A method of introducing a reactive silicon group into (meth)acrylate-based polymer (a2) includes various methods. For example, (I) a method of copolymerizing a compound having a polymerizable unsaturated bond and a reactive silicon group with a monomer, (II) a method of copolymerizing in the presence of a mercaptan containing a reactive silicon group as a chain transfer agent, and a method of copolymerizing a compound having a polymerizable unsaturated bond and a reactive silicon group with a monomer in the presence of a mercaptan containing a reactive silicon group as a chain transfer agent, as a combination of (I) and (II), can also be adopted.

Examples of the compound having a polymerizable unsaturated bond and a reactive silicon group described in (I) include γ-methacryloxypropyltrimethoxysilane, γ-methacryloxypropyltriethoxysilane, γ-acryloxypropyltrimethoxysilane, γ-acryloxypropyltriethoxysilane, methacryloyloxymethyltrimethoxysilane, methacryloyloxymethyltriethoxysilane, vinyltrimethoxysilane, vinyltriethoxysilane and the like.

The mercaptan compound containing a reactive silicon group described in (II) includes mercapto group-containing silanes such as γ-mercaptopropyltrimethoxysilane, γ-mercaptopropyltriethoxysilane, mercaptomethyltrimethoxysilane and mercaptomethyltriethoxysilane.

A silicon atom is preferably contained at not less than 0.04 mol and not more than 0.20 mol, more preferably not less than 0.05 mol and not more than 0.10 mol, further preferably not less than 0.06 mol and not more than 0.09 mol, in 100 g of (meth)acrylate-based polymer (a2). When it is not more than 0.04 mmol, the obtained cured product tends to have a decreased strength, and when it exceeds 0.20 mmol, the storage stability unpreferably tends to decrease. As a calculation method of the above-mentioned silicon atom, the number of moles of the reactive silicon group-containing substance used is divided by the total weight of a monomer and a chain transfer agent.

The reactive silicon group is preferably not less than 1.0 and not more than 5.0, more preferably not less than 1.1 and not more than 3.0, further preferably not less than 1.2 and not more than 2.0, particularly preferably not less than 1.3 and not more than 2.0, in 1 molecule of (meth)acrylate-based polymer (a2). When it is not more than 1.0, the obtained cured product tends to have a decreased strength, and when it exceeds 5.0, the storage stability unpreferably tends to decrease. As a calculation method of the above-mentioned silicon group in one molecule, it is determined from the number average molecular weight by GPC and the monomer unit used.

In one or more embodiments of the present invention, one or more kinds of reactive silicon group-containing (meth)acrylate-based polymer (A2) can be used.

When reactive silicon group-containing polyoxyalkylene-based polymer (A1) and reactive silicon group-containing (meth)acrylate-based polymer (A2) are used in combination as component (A) of the curable composition of the present invention, the ratio of polyoxyalkylene-based polymer (a1) and (meth)acrylate-based polymer (a2) in the curable composition of the present invention, (a1)/(a2) in a weight ratio, is preferably 20/80-90/10 from the aspects of the compatibility, viscosity and strength of the cured product. It is more preferably 30/70-80/20, further preferably 40/60-70/30, particularly preferably 50/50-60/40.

When reactive silicon group-containing polyoxyalkylene-based polymer (A1) and reactive silicon group-containing (meth)acrylate-based polymer (A2) are used in combination as component (A), it is preferable to obtain an organic polymer of a blend of these two polymers in advance, and subject the organic polymer to the preparation of a curable composition. These two polymers may be directly subjected to the preparation of a curable composition. While the production method of an organic polymer of a blend of reactive silicon group-containing polyoxyalkylene-based polymer (A1) and reactive silicon group-containing (meth)acrylate-based polymer (A2) is proposed in JP-A-59-122541, JP-A-63-112642, JP-A-6-172631, JP-A-11-116763 and the like, the method is not particularly limited to these. Furthermore, a method including polymerization of a (meth)acrylate monomer in the presence of a reactive silicon group-containing polyoxyalkylene-based polymer can be utilized. While this production method is specifically disclosed in the publications of JP-A-59-78223, JP-A-59-168014, JP-A-60-228516, JP-A-60-228517 and the like, the method is not particularly limited to these.

In one or more embodiments, the curable composition of the present invention contains component (B), i.e., a bound substance of kaolinite and quartz, as an essential component. The bound substance of kaolinite and quartz is sometimes described as "aggregate of kaolinite and quartz" or "united structure of kaolinite and quartz" in technical documents. That is, the "bound substance of kaolinite and quartz", the "aggregate of kaolinite and quartz" and the "united structure of kaolinite and quartz" are generally known to mean the same, and sometimes the "bound substance of kaolinite and quartz" is also called "Neuburg siliceous earth (siliceous earth)", "Sillitin", "Sillicolloid" and the like.

While the bound substance of kaolinite and quartz may be a naturally-occurring substance or an artificially produced product having a similar structure as the naturally-occurring substance, with preference given to a natural bound substance of plate kaolinite and bulk quartz. The bound substance of kaolinite and quartz is preferably subjected to a calcination treatment and has a kaolinite content of not more than 15 wt %, more preferably not more than 13 wt %, from the aspects of water-resistant adhesiveness and initial adhesion strength.

While the lower limit of the kaolinite content is not particularly limited, not less than 5 wt % is preferable. As the bound substance of kaolinite and quartz, AKTISIL of Hoffmann Mineral, such as Aktisil PF216 and the like, SILFIT, AKTIFIT, Sillitin Z86, Sillitin Z86 puriss, Sillitin V85, Sillitin N82, Sillitin 85, Sillitin N87 and the like can be specifically mentioned. Of these, a grade subjected to a calcination treatment and having a kaolinite content of not more than 15 wt % is particularly preferable.

An average particle size, i.e., $D_{50}$ particle size of a bound substance of kaolinite and quartz is preferably 1-3 μm, more preferably 1.5-2.5 μm. The $D_{50}$ particle size is a volume standard median size measured by a particle size distribution measuring apparatus of a laser diffraction•scattering type.

The bound substance of kaolinite and quartz is preferably subjected to a surface treatment from the aspect of dispersibility in component (A), and particularly preferably surface-treated with a silane coupling agent. While the silane coupling agent here is not particularly limited, vinyl unsaturated group-containing silanes (vinylsilanes) such as vinyltrimethoxysilane, vinyltriethoxysilane, γ-methacryloyloxypropylmethyldimethoxysilane, γ-acryloyloxypropylmethyltriethoxysilane and the like are preferable. The surface treatment can be performed by, for example, dispersing by stirring an untreated bound substance of kaolinite and quartz by a blending machine at ambient temperature, and continuing stirring while addition spraying a silane coupling agent. A commercially available bound substance of kaolinite and quartz surface-treated with a silane coupling agent can be used as it is.

The amount of component (B) is preferably 1-500 parts by weight, more preferably 20-300 parts by weight, particularly preferably 30-200 parts by weight, most preferably 50-100 parts, relative to 100 parts by weight of component (A). When component (B) is not added, the obtained cured product is insufficient in the strength and water-resistant adhesiveness, and when it is too much, the cured product sometimes has too high an elastic modulus and decreased adhesion strength.

In one or more embodiments, the curable composition of the present invention can contain, in addition to component (A) and component (B), an epoxy group-containing silane coupling agent (component (C)) as an adhesion-imparting agent.

The epoxy group-containing silane coupling agent is a compound having a hydrolyzable silyl group and an epoxy group, and concrete examples thereof include epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, β-(3,4-epoxycyclohexyl)ethyltriethoxysilane and the like. Of these, γ-glycidoxypropyltrimethoxysilane, γ-glycidoxypropyltriethoxysilane, γ-glycidoxypropylmethyldimethoxysilane is preferable.

In one or more embodiments of the curable composition of the present invention, one or more kinds of component (C) can be used. In addition, the amount of component (C) is preferably 1-20 parts by weight, particularly preferably 2-10 parts by weight, relative to 100 parts by weight of the component (A).

As mentioned below, one or more embodiments of the curable composition of the present invention can contain an amidine compound (component (D)). When an amidine compound (component (D)) is added, an amino group-containing silane coupling agent can be used in combination with an epoxy group-containing silane coupling agent to suppress bleeding.

Specific examples of the amino group-containing silane coupling agent include γ-aminopropyltrimethoxysilane, γ-aminopropyltriethoxysilane, γ-aminopropylmethyldimethoxysilane, γ-aminopropylmethyldiethoxysilane, N-β-aminoethyl-γ-aminopropyltrimethoxysilane, N-β-aminoethyl-γ-aminopropylmethyldimethoxysilane, N-β-aminoethyl-γ-aminopropyltriethoxysilane, N-β-aminoethyl-γ-ureidopropyltrimethyldiethoxysilane, γ-ureidopropyltrimethoxysilane, N-phenyl-γ-aminopropyltrimethoxysilane, N-benzyl-γ-aminopropyltrimethoxysilane, N-vinylbenzyl-γ-aminopropyltriethoxysilane, (aminomethyl)dimethoxymethylsilane, (aminomethyl)trimethoxysilane, (phenylaminomethyl)dimethoxymethylsilane, (phenylaminomethyl)trimethoxysilane, bis(3-trimethoxysilylpropyl)amine and the like. One or more kinds of amino group-containing silane coupling agent can be used. The amount of the amino group-containing silane coupling agent is preferably 1-10 parts by weight relative to 100 parts by weight of component (A).

In one or more embodiment, the curable composition of the present invention can contain, as a curing catalyst of polymer (A) having a reactive silicon group, amidine compound (D) represented by the formula (6):

wherein $R^9$, $R^{10}$, and two $R^{11}$ are each independently a hydrogen atom or an organic group, and the presence of such amidine compound (D) affords a curable composition having good water-resistant adhesiveness. That is, the curable composition of one or more embodiments of the present invention containing amidine compound (D) shows practical curability, and the obtained cured product shows good adhesiveness to various adherends, even though amidine compound (D) is a non-organotin-based catalyst.

To enhance curability of polymer (A), $R^9$ in the formula (6) is preferably a hydrogen atom or a hydrocarbon group, more preferably a hydrocarbon group wherein the carbon atom at the α-position of nitrogen atom does not have an unsaturated bond. When $R^9$ is an organic group or hydrocarbon group, the carbon atom number is preferably 1-20, more preferably 1-10, since such group is easily available.

To enhance curability of polymer (A), $R^{10}$ in the formula (6) is preferably a hydrogen atom or an organic group represented by —$NR^{12}_2$ (wherein two $R^{12}$ are each independently a hydrogen atom or an organic group having 1-20 carbon atoms), more preferably an organic group represented by —$NR^{12}_2$.

An amidine compound of the formula (6) wherein $R^{10}$ is an organic group represented by the aforementioned —$NR^{12}_2$ is called a guanidine compound. As the guanidine compound, one wherein $R^{12}$ is a hydrogen atom or a hydrocarbon group having 1-20 carbon atoms is preferable, and one wherein $R^{12}$ is a hydrogen atom or a hydrocarbon group having 1-10 carbon atoms is more preferable, in view of easy availability and a higher effect of enhancing curability of polymer (A).

In the formula (6), $R^H$ is preferably an organic group represented by —$NR^{19}$—C(=$NR^{14}$)—$NR^{15}_2$ (wherein $R^{13}$, $R^{14}$ and two $R^{15}$ are each independently a hydrogen atom or an organic group having 1-6 carbon atoms) and/or —N=C($NR^{16}_2$)—$NR^{17}_2$ (wherein two $R^{16}$ and two $R^{17}$ are each independently a hydrogen atom or an organic group having 1-6 carbon atoms), since the obtained cured product shows good adhesiveness.

An amidine compound of the formula (6) wherein $R^{10}$ is an organic group such as the aforementioned —$NR^{19}$—C(=$NR^{14}$)—$NR^{15}_2$, —N=C($NR^{16}_2$)—$NR^{17}_2$ and the like is called a biguanide compound.

A biguanide compound of the formula (6) wherein $R^{10}$ is an organic group represented by —$NR^{13}$—C(=$NR^{14}$)—$NR^{15}_2$ is preferably one wherein $R^{13}$, $R^{14}$ and two $R^{15}$ are each independently a hydrogen atom or a hydrocarbon group having 1-20 carbon atoms, more preferably one wherein $R^{13}$, $R^{14}$ and two $R^{15}$ are each independently a hydrogen atom or a hydrocarbon group having 1-10 carbon atoms, in view of easy availability and good adhesiveness of the obtained cured product. At least one of $R^9$, two $R^{11}$, $R^{13}$, $R^{14}$ and two $R^{15}$ is particularly preferably an aryl group, since the adhesiveness of the obtained cured product is further improved.

A biguanide compound wherein $R^{10}$ is an organic group represented by —N=C($NR^{16}_2$)—$NR^{17}_2$ is preferably one wherein $R^9$, two $R^{11}$, $R^{16}$, and two $R^{17}$ are each independently a hydrogen atom or a hydrocarbon group having 1-20 carbon atoms, more preferably one wherein $R^9$, two $R^{11}$, $R^{16}$, and two $R^{17}$ are each independently a hydrogen atom or a hydrocarbon group having 1-10 carbon atoms, in view of easy availability and good adhesiveness of the obtained cured product.

Two $R^{11}$ in the formula (6) are each preferably a hydrogen atom or a hydrocarbon group having 1-20 carbon atoms, more preferably a hydrogen atom or a hydrocarbon group having 1-10 carbon atoms, in view of easy availability and high curability of polymer (A).

The carbon atom number of amidine compound (D) of the formula (6) is preferably two or more, more preferably not less than 6, particularly preferably not less than 7.

When the carbon atom number is small such as less than 2 (small molecular weight), volatility of the compound tends to increase and the work environment tends to be degraded. While the upper limit of the carbon atom number of amidine compound (D) does not need to be particularly defined, it is generally preferably not more than 10,000. For a similar reason as above, the molecular weight of amidine compound (D) is preferably not less than 60, more preferably not less than 120, particularly preferably not less than 130. While the upper limit of the molecular weight does not need to be particularly defined, it is generally preferably not more than 100,000.

While amidine compound (D) (including guanidine compound, biguanide compound) is not particularly limited, for example, pyrimidine compounds such as pyrimidine, 2-aminopyrimidine, 6-amino-2,4-dimethylpyrimidine, 2-amino-4,6-dimethylpyrimidine, 1,4,5,6-tetrahydropyrimidine, 1,2-dimethyl-1,4,5,6-tetrahydropyrimidine, 1-ethyl-2-methyl-1,4,5,6-tetrahydropyrimidine, 1,2-diethyl-1,4,5,6-tetrahydropyrimidine, 1-n-propyl-2-methyl-1,4,5,6-tetrahydropyrimidine, 2-hydroxy-4,6-dimethylpyrimidine, 1,3-diazanaphthalene, 2-hydroxy-4-aminopyrimidine and the like; imidazoline compounds such as 2-imidazoline, 2-methyl-2-imidazoline, 2-ethyl-2-imidazoline, 2-propyl-2-imidazoline, 2-vinyl-2-imidazoline, 1-(2-hydroxyethyl)-2-methyl-2-imidazoline, 1,3-dimethyl-2-iminoimidazolidine, 1-methyl-2-iminoimidazolidin-4-one and the like; amidine compounds such as 1,8-diazabicyclo[5.4.0]undec-7-ene (DBU), 1,5-diazabicyclo[4.3.0]non-5-ene, 2,9-diazabicyclo[4.3.0]non-1,3,5,7-tetraene, 6-(dibutylamino)-1,8-diazabicyclo[5,4,0]undecene-7(DBA-DBU) and the like; guanidine compounds such as guanidine, dicyandiamide, 1-methylguanidine, 1-ethylguanidine, 1-cyclohexylguanidine, 1-phenylguanidine, 1-(o-tolyl)guanidine, 1,1-dimethylguanidine, 1,3-dimethylguanidine, 1,2-diphenylguanidine, 1,1,2-trimethylguanidine, 1,2,3-trimethylguanidine, 1,1,3,3-tetramethylguanidine, 1,1,2,3,3-pentamethylguanidine, 2-ethyl-1,1,3,3-tetramethylguanidine, 1,1,3,3-tetramethyl-2-n-propylguanidine, 1,1,3,3-tetramethyl-2-isopropylguanidine, 2-n-butyl-1,1,3,3-tetramethylguanidine, 2-tert-butyl-1,1,3,3-tetramethylguanidine, 1,2,3-tricyclohexylguanidine, 1-benzyl-2,3-dimethylguanidine, 1,5,7-triazabicyclo[4.4.0]dec-5-ene, 7-methyl-1,5,7-triazabicyclo[4.4.0]dec-5-ene, 7-ethyl-1,5,7-triazabicyclo[4.4.0]dec-5-ene, 7-n-propyl-1,5,7-triazabicyclo[4.4.0]dec-5-ene, 7-isopropyl-1,5,7-triazabicyclo[4.4.0]dec-5-ene, 7-n-butyl-1,5,7-triazabicyclo[4.4.0]dec-5-ene, 7-cyclohexyl-1,5,7-triazabicyclo[4.4.0]dec-5-ene, 7-n-octyl-1,5,7-triazabicyclo[4.4.0]dec-5-ene and the like; biguanide compounds such as biguanide, 1-methylbiguanide, 1-ethylbiguanide, 1-n-butylbiguanide, 1-(2-ethylhexyl)biguanide, 1-n-octadecylbiguanide, 1,1-dimethylbiguanide, 1,1-diethylbiguanide, 1-cyclohexylbiguanide, 1-allylbiguanide, 1-phenylbiguanide, 1-(o-tolyl)biguanide, 1-morpholinobiguanide, 1-n-butyl-N2-ethylbiguanide, 1,1'-ethylenebisbiguanide, 1,5-ethylenebiguanide, 1-[3-(diethylamino)propyl]biguanide, 1-[3-(dibutylamino)propyl]biguanide, N',N''-dihexyl-3,12-diimino-2,4,11,13-tetraazatetradecane diamidine and the like; and the like can be mentioned. Of these, 1,8-diazabicyclo[5.4.0]undec-7-ene (DBU) is preferable since the cured product shows good water-resistant adhesiveness. DBU can also be used in the form of a salt with phenol or carboxylic acid.

The amount of the amidine compound (D) is preferably 0.1-30 parts by weight, more preferably 0.1-12 parts by weight, particularly preferably 0.1-2 parts by weight, per 100 parts by weight of polymer (A). When the amount of the amidine compound is less than 0.1, a practical curing rate of the curable composition sometimes cannot be achieved and the curing reaction tends to be difficult to proceed. On the other hand, when the amount of amidine compound (D) exceeds 30 parts by weight, the cure time of the curable composition tends to be too short to degrade workability, and a bleed phenomenon including transfer of an amidine compound to the surface of a cured product tends to occur. In one or more embodiments of the curable composition of the present invention, a curing catalyst other than amidine compound (D) can be used as a curing catalyst.

A curing catalyst other than an amidine compound is not particularly limited and, for example, metal carboxylates such as tin carboxylate, lead carboxylate, bismuth carboxylate, potassium carboxylate, calcium carboxylate, barium carboxylate, titanium carboxylate, zirconium carboxylate, hafnium carboxylate, vanadium carboxylate, manganese carboxylate, iron carboxylate, cobalt carboxylate, nickel carboxylate, cerium carboxylate and the like; titanium compounds such as tetrabutyl titanate, tetrapropyl titanate, titanium tetrakis(acetylacetonate), bis(acetylacetonate)diisopropoxytitanium, diisopropoxytitanium bis(ethylacetoacetate) and the like; organic tin-based compounds such as dibutyltin dilaurate, dibutyltin maleate, dibutyltin phthalate, dibutyltin dioctanoate, dibutyltin bis(2-ethylhexanoate), dibutyltin bis(methylmaleate), dibutyltin bis(ethylmaleate), dibutyltin bis(butylmaleate), dibutyltin bis(octylmaleate), dibutyltin bis(tridecylmaleate), dibutyltin bis(benzylmaleate), dibutyltin diacetate, dioctyltin bis(ethylmaleate), dioctyltin bis(octylmaleate), dibutyltin dimethoxide, dibutyltin bis(nonylphenoxide), dibutenyltin oxide, dibutyltin oxide, dibutyltin bis(acetylacetonate), dibutyltin bis(ethylacetoacetonate), reaction product of dibutyltin oxide and a silicate compound, reaction product of dibutyltin oxide and a phthalate and the like; organic aluminum compounds such as aluminum tris(acetylacetonate), aluminum tris(ethylacetoacetate), diisopropoxyaluminum ethylacetoacetate and the like; zirconium compounds such as zirconium tetrakis(acetylacetonate) and the like; various metal alkoxides such as tetrabutoxy hafnium and the like; organic acidic phosphates; organic sulfonic acids such as trifluoromethanesulfonic acid and the like; inorganic acids such as hydrochloric acid, phosphoric acid, boronic acid and the like; and the like can be mentioned. A combined use of these curing catalysts other than amidine compound with amidine compound (D) is expected to enhance catalyst activity and improve depth curability and thin layer curability of a curable composition, adhesiveness of the obtained cured product and the like. One or more kinds of curing catalyst other than an amidine compound can be used. The amount of the curing catalyst other than an amidine compound is preferably 0.1-5 parts by weight relative to 100 parts by weight of component (A).

When an organotin-based compound is used as a curing catalyst other than an amidine compound, water-resistant adhesiveness can be further improved. However, the toxicity of a curable composition tends to increase as the amount of organotin increases. Therefore, the amount of the organotin-based compound is preferably smaller. More specifically, it is preferably not more than 1 part by weight, more preferably not more than 0.5 part by weight, relative to 100 parts by weight of component (A). While the lower limit is not particularly limited, it is preferably not less than 0.1 part by weight to obtain a sufficient effect of blending.

In one or more embodiments, the curable composition of the present invention may contain a plasticizer. Addition of a plasticizer enables adjustment of the viscosity and slump property of a curable composition, and mechanical properties of a cured product obtained by curing the curable composition, such as hardness, tensile strength, elongation and the like. Specific examples of the plasticizer include phthalate compounds such as dibutyl phthalate, diisononyl phthalate (DINP), diheptyl phthalate, di(2-ethylhexyl) phthalate, diisodecyl phthalate (DIDP), butyl benzyl phthalate and the like; terephthalate compounds such as bis(2-ethylhexyl)-1,4-benzenedicarboxylate and the like (specifically, trade name: EASTMAN168 (manufactured by EASTMAN CHEMICAL)); non-phthalate compounds such as diisononyl 1,2-cyclohexanedicarboxylate and the like (specifically, trade name: Hexamoll DINCH (manufactured by BASF)); polyvalent aliphatic carboxylate compounds such as dioctyl adipate, dioctyl sebacate, dibutyl sebacate, diisodecyl succinate, tributyl acetylcitrate and the like; unsaturated fatty acid ester compounds such as butyl oleate, methyl acetylricinoleate and the like; phenyl alkylsulfonate (specifically, trade name: Mesamoll (manufactured by LANXESS)); phosphate compounds such as tricresyl phosphate, tributyl phosphate and the like; trimellitate compound; chlorinated paraffin; hydrocarbon-based oil such as alkyl diphenyl, partially hydrogenated terphenyl and the like; process oil; epoxy plasticizer such as epoxydized soybean oil, benzyl epoxystearate and the like, and the like.

As the plasticizer, a polymer plasticizer can be used. When a polymer plasticizer is used, the initial properties can be maintained for a long term as compared to the use of a low molecular weight plasticizer. Furthermore, drying performance (coatability) when alkyd paint is applied to a cured product can be improved. Specific examples of the polymer plasticizer include, but are not particularly limited to, a vinyl polymer obtained by polymerization of a vinyl monomer by various methods; polyalkyleneglycol esters such as diethylene glycol dibenzoate, triethylene glycol dibenzoate, pentaerythritol ester and the like; polyester-based plasticizer obtained from a dibasic acid such as sebacic acid, adipic acid, azelaic acid, phthalic acid and the like and a divalent alcohol such as ethyleneglycol, diethylene glycol, triethylene glycol, propylene glycol, dipropyleneglycol and the like; polyethers such as polyether polyols having a number average molecular weight of not less than 500, further not less than 1,000, such as polyethylene glycol polypropylene glycol, polytetramethyleneglycol and the like, derivatives wherein the hydroxy group of these polyether polyols is converted to ester group, ether group and the like, and the like; polystyrenes such as polystyrene, poly-α-methylstyrene and the like; polybutadiene, polybutene, polyisobutylene, butadiene-acrylonitrile, polychloroprene and the like.

Of these polymer plasticizers, those compatible with polymer (A) are preferable. From such aspects, a polyether-based polymer or a vinyl polymer is preferable. In addition, a polyether-based polymer is preferably used as a plasticizer, since surface curability and depth curability are improved, and curing retardation after storage does not occur. Of these, polypropylene glycol is more preferable. From the aspects of compatibility and weatherability, heat resistance vinyl polymer is preferable. Of the vinyl polymers, acrylate-based polymers such as poly(alkyl (meth)acrylate) and the like are particularly preferable. As the synthesis method of the polymer, a living radical polymerization method is preferable, and an atom transfer radical polymerization method is more preferable, since the molecular weight distribution is narrow and low viscosity can be achieved. In addition, a polymer obtained by continuous bulk polymerization of alkyl (meth)acrylate-based monomer at a high temperature and high pressure, so-called SGO process, described in JP-A-2001-207157, is preferably used.

While the number average molecular weight of the polymer plasticizer is preferably 500 to 15,000, it is more preferably 800 to 10,000, further preferably 1,000 to 8,000, particularly preferably 1,000 to 5,000. It is most preferably 1,000 to 3,000. When the molecular weight is too low, plasticizer flows out over time due to heat and rainfall, and the initial property cannot be maintained for a long term. When the molecular weight is too high, the viscosity becomes high to degrade workability.

The molecular weight distribution (Mw/Mn) of the polymer plasticizer is not particularly limited, but preferably narrow. It is preferably less than 1.80, more preferably not more than 1.70, still more preferably not more than 1.60, more preferably not more than 1.50, particularly preferably not more than 1.40, most preferably not more than 1.30.

The number average molecular weight of the polymer plasticizer is measured by a GPC method in the case of a vinyl polymer, and by a terminal group analysis in the case of a polyether-based polymer. In addition, the molecular weight distribution (Mw/Mn) is measured by GPC method (based on polystyrene).

The amount of the plasticizer to be used is preferably 5-150 parts by weight, more preferably 10-120 parts by weight, particularly preferably 20-100 parts by weight, relative to 100 parts by weight of component (A). When the content is less than 5 parts by weight, the effect of the plasticizer is not developed, and when it exceeds 150 parts by weight, the mechanical strength of a cured product tends to be insufficient. One or more kinds of plasticizer can be used. In addition, a low molecular weight plasticizer and a polymer plasticizer may be used in combination. The plasticizers can also be added during production of polymer.

In one or more embodiments, the curable composition of the present invention can contain a solvent or diluent. While the solvent and the diluent are not particularly limited, aliphatic hydrocarbon, aromatic hydrocarbon, alicyclic hydrocarbon, halogenated hydrocarbon, alcohol, ester, ketone, ether and the like can be used. When a solvent or diluent is used, the solvent or diluent preferably has a boiling point of not less than 150° C., more preferably not less than 200° C., particularly preferably not less than 250° C., in view of air pollution during indoor use of the composition. A solvent or diluent may be used alone or two or more kinds thereof may be used in combination.

In one or more embodiments, the curable composition of the present invention can further contain a silane coupling agent other than epoxy group-containing silane coupling agent (C) and the aforementioned amino group-containing silane coupling agent, a reaction product of a silane coupling agent, or a compound other than a silane coupling agent, as an adhesion-imparting agent.

Specific examples of such silane coupling agent include isocyanate group-containing silanes such as γ-isocyanatepropyltrimethoxysilane, γ-isocyanatepropyltriethoxysilane, γ-isocyanatepropylmethyldiethoxysilane, γ-isocyanatepropylmethyldimethoxysilane, α-isocyanatemethyltrimethoxysilane, α-isocyanatemethyldimethoxymethylsilane and the like; mercapto group-containing silanes such as γ-mercaptopropyltrimethoxysilane, γ-mercaptopropyltriethoxysilane, γ-mercaptopropylmethyldimethoxysilane, γ-mercaptopropylmethyldiethoxysilane and the like; carboxysilanes such as β-carboxyethyltriethoxysilane, (β-carboxyethylphenylbis(β-methoxyethoxy)silane, N-β-(carboxymethyl)aminoethyl-γ-aminopropyltrimethoxysilane and the like; vinyl unsaturated group-containing silanes such as vinyltrimethoxysilane, vinyltriethoxysilane, γ-methacryloyloxypropylmethyldimethoxysilane, γ-acryloyloxypropylmethyltriethoxysilane and the like; halogen-containing silanes such as γ-chloropropyltrimethoxysilane and the like; isocyanuratesilanes such as tris(trimethoxysilyl)isocyanurate and the like; carbamatesilanes such as methyl(N-dimethoxymethylsilylmethyl)carbamate, methyl (N-trimethoxysilylmethyl)carbamate, methyl(N-dimethoxymethylsilylpropyl)carbamate, methyl(N-trimethoxysilylpropyl)carbamate and the like; alkoxy group-containing silanes such as (methoxymethyl)dimethoxymethylsilane, (methoxymethyl)trimethoxysilane, (ethoxymethyl)trimethoxysilane, (phenoxymethyl)trimethoxysilane and the like; acid anhydride-containing silanes such as 3-(trimethoxysilyl)propylsuccinic anhydride, 3-(triethoxysilyl)propylsuccinic anhydride and the like, and the like. In addition, partial condensates of these silanes, and modified silanes of these derivatives, such as amino-modified silyl polymer, silylated amino polymer, unsaturated aminosilane complex, phenylamino long chain alkylsilane, aminosilylated silicone, silylated polyester and the like can also be used as silane coupling agents. One or more kinds of these silane coupling agents can be used. The reaction product of silane coupling agent includes a reaction product of isocyanate silane and a hydroxyl group-containing compound, an amino group-containing compound or the like; a Michael addition reaction product of aminosilane; a reaction product of aminosilane and an epoxy group-containing compound; a reaction product of epoxy silane and a carboxylic acid group-containing compound, an amino group-containing compound or the like, and the like.

The amount of such silane coupling agent and a reaction product of the silane coupling agent to be used is preferably 0.1-20 parts by weight, particularly preferably 0.5-10 parts by weight, relative to 100 parts by weight of component (A).

Specific examples of the adhesiveness-imparting agent other than the silane coupling agent include, but are not particularly limited to, phenol resin, sulfur, alkyl titanates, aromatic polyisocyanate and the like. One or more kinds of such adhesion-imparting agent can be used. Addition of such adhesion-imparting agents can improve adhesiveness of a cured product to an adherend.

In addition, one or more embodiments of the curable composition of the present invention can contain a silicate. The silicate acts as a crosslinking agent and has a function to improve recovery property, durability, and creep resistance of a cured product obtained from the curable composition of the present invention. Furthermore, the silicate also has an effect to improve the adhesiveness and water-resistant adhesiveness, as well as adhesion durability under high temperature and high humidity conditions. As a silicate, a tetraalkoxysilane and alkylalkoxysilane or a partially hydrolyzed condensate thereof can be used.

Specific examples of the silicate include a tetraalkoxysilanes (tetraalkyl silicates) and a partially hydrolyzed condensate thereof such as tetramethoxysilane, tetraethoxysilane, ethoxytrimethoxysilane, dimethoxydiethoxysilane, methoxytriethoxysilane, tetra-n-propoxysilane, tetra-i-propoxysilane, tetra-n-butoxy silane, tetra-i-butoxysilane, tetra-t-butoxysilane and the like, and the like.

The partially hydrolyzed condensate of a tetraalkoxysilane is more preferable since it shows a greater improvement effect on resilience, durability and creep resistance of the cured product than a tetraalkoxysilane.

As the partially hydrolyzed condensate of a tetraalkoxysilane, for example, one obtained by adding water to a tetraalkoxysilane to allow partial hydrolysis and then condensation thereof by a conventional method can be mentioned as an example. In addition, as the partially hydrolyzed condensate of a tetraalkoxysilane, a commercially available product can be used. As such condensates, for example, methyl silicate 51, ethyl silicate 40 (both manufactured by COLCOAT CO., LTD.) and the like can be mentioned as examples.

One or more kinds of silicate can be used. When silicate is used, the amount thereof to be used is 0.1-20 parts by weight, preferably 0.5-10 parts by weight, relative to 100 parts by weight of component (A).

In one or more embodiments, the curable composition of the present invention can contain various fillers. As fillers, reinforcing fillers such as fumed silica, precipitated silica, crystal silica, molten silica, dolomite, silicic anhydride, hydrous silicate, aluminum hydroxide, and carbon black; fillers such as ground calcium carbonate, colloidal calcium carbonate, magnesium carbonate, diatomite, calcined clay, clay, talc, titanium oxide, bentonite, organic bentonite, ferric oxide, aluminum fine powder, flint powder, zinc oxide, activated zinc oxide, resin powders such as PVC powder, PMMA1 powder and the like; fiber fillers such as asbestos, glass fiber and filament, and the like can be mentioned.

The filler can be dried in advance by dehydration including, as described in JP-A-2001-181532, uniformly mixing the filler with a dehydrating agent such as calcium oxide and the like, sealing the mixture in a bag made of an air-tight material, and leaving the bag for a suitable time period. Using this low water content filler, the storage stability of particularly a one-component composition can be improved.

When a cured product with a high strength is desired to be obtained by using these fillers, a filler mainly selected from fumed silica, precipitated silica, crystal silica, molten silica, dolomite, silicic anhydride, hydrous silicate and carbon black, aluminum hydroxide, surface-treated fine calcium carbonate, calcined clay, clay, and activated zinc oxide and the like are preferable, and the amount thereof to be used is preferably 1-200 parts by weight relative to 100 parts by weight of component (A).

When a cured product having a low strength and a high elongation at break is desired to be obtained, preferable results can be obtained by using 5-200 parts by weight of a filler selected from titanium oxide, calcium carbonate such as ground calcium carbonate and the like, magnesium carbonate, talc, ferric oxide, zinc oxide, and Shirasu balloon and the like relative to 100 parts by weight of component (A). In general, calcium carbonate having a greater specific surface area shows greater improving effect on the tensile strength at break, elongation at break and adhesiveness of the cured product. When calcium carbonate is used, surface-treated fine calcium carbonate and calcium carbonate having a large particle size such as ground calcium carbonate and the like are desirably used in combination. The particle size of surface-treated fine calcium carbonate is preferably not more than 0.5 μm, and a surface treatment is preferably performed using fatty acid or fatty acid salt. The particle size of calcium carbonate having a large particle size is preferably not less than 1 μm and one free of a surface treatment can be used. Examples of the surface treating agent for producing surface-treated calcium carbonate powder include, but are not limited to, carboxylic acids and esters thereof such as fatty acid or unsaturated fatty acid represented by palmitic acid, caprylic acid, capric acid, lauric acid, stearic acid, arachidic acid, behenic acid, lignoceric acid, oleic acid, linoleic acid, linolenic acid and the like, and rosin acid-based compound and the like, silane compounds such as hexamethyldisilazane, chlorosilane, aminosilane and the like, paraffin-based compound and the like. Particularly, the surface treating agent is preferably carboxylic acid, since a curable composition containing an organic polymer containing a reactive silicon group as the main component hardly shows cure retardation. Among carboxylic acids, saturated fatty acid and unsaturated fatty acid are particularly preferable, since curing retardation more hardly occurs. One or more kinds of filler can be used, and fatty acid surface-treated colloidal calcium carbonate and calcium carbonate having a particle size of not less than 1 μm such as ground calcium carbonate free of a surface treatment and the like can also be used in combination.

The amount of the filler to be used is preferably 1-300 parts by weight, particularly preferably 10-200 parts by weight, relative to 100 parts by weight of component (A).

To improve the handling property (short thread and the like) of the composition of the present invention and produce a matte surface of the cured product, organic balloon and inorganic balloon may be added in one or more embodiments. Such fillers can be subjected to a surface treatment, only one kind thereof may be used, or two or more kinds thereof may be mixed and used. For improved workability (short thread and the like), the particle size of the balloon is preferably not more than 0.1 mm. For matte surface of the cured product, it is preferably 5-300 μm.

In one or more embodiments, the curable composition of the present invention may contain an anti-sagging agent, as necessary, to prevent sagging and improve workability. While the anti-sagging agent is not particularly limited, for example, polyamide waxes; hydrogenated castor oil derivatives; metal soaps such as calcium stearate, aluminum stearate, barium stearate and the like, and the like can be mentioned as examples. When a rubber powder having a particle size of 10-500 μm as described in JP-A-11-349916 or an organic fiber as described in JP-A-2003-155389 is used, a composition showing high thixotropy and good workability can be obtained. Such anti-sagging agent may be used alone, or two or more kinds thereof may be used in combination.

The amount of the anti-sagging agent to be used is preferably 0.1-20 parts by weight relative to 100 parts by weight of component (A).

In one or more embodiments, the curable composition of the present invention can contain an antioxidant (anti-aging agent). When an antioxidant is used, weather resistance of a cured product can be enhanced. Examples of the antioxidant include hindered phenol-based antioxidant, monophenol-based antioxidant, bisphenol-based antioxidant, and polyphenol-based antioxidant, and hindered phenol-based antioxidant is particularly preferable. Similarly, hindered amine photostabilizers such as Tinuvin 622 LD, Tinuvin 144; CHIMASSORB944LD, CHIMASSORB119FL (each of the above manufactured by Ciba Japan K.K.); Adekastab LA-57, Adekastab LA-62, Adekastab LA-67, Adekastab LA-63, Adekastab LA-68 (each of the above is manufactured by ADEKA CORPORATION); Sanol LS-770, Sanol LS-765, Sanol LS-292, Sanol LS-2626, Sanol LS-1114, Sanol LS-744 (each of the above is manufactured by Sankyo Lifetech Co., Ltd.), and the like can also be used. Specific examples of the antioxidant are also recited in JP-A-4-283259 and JP-A-9-194731. One or more kinds of antioxidant can be used.

The amount of the antioxidant to be used is preferably 0.1-10 parts by weight, particularly preferably 0.2-5 parts by weight, relative to 100 parts by weight of component (A).

In one or more embodiments, the curable composition of the present invention can contain a light stabilizer. Use of a light stabilizer prevents degradation of a cured product due to photooxidation. Examples of the light stabilizer include benzotriazole-based, hindered amine-based, benzoate-based compounds and the like, and a hindered amine-based one is particularly preferable.

The amount of the light stabilizer to be used is preferably 0.1-10 parts by weight, particularly preferably 0.2-5 parts by weight, relative to 100 parts by weight of component (A).

In one or more embodiments, when a photocurable substance, particularly an unsaturated acrylic compound, is added to the curable composition of the present invention, a tertiary amine-containing hindered amine-based light stabilizer is preferably used as a hindered amine-based light stabilizer, as described in JP-A-5-70531, to improve preservation stability of the curable composition. Examples of the tertiary amine-containing hindered amine-based light stabilizer include light stabilizers such as Tinuvin 622 LD, Tinuvin 144; CHIMASSORB119FL (each of the above manufactured by Ciba Japan K.K.); Adekastab LA-57, LA-62, LA-67, LA-63 (each of the above is manufactured by ADEKA CORPORATION); Sanol LS-765, LS-292, LS-2626, LS-1114, LS-744 (each of the above is manufactured by Sankyo Lifetech Co., Ltd.), and the like.

In one or more embodiments, in the curable composition of the present invention, a UV absorber can be used. When a UV absorber is used, weather resistance of the surface of a cured product can be enhanced. Examples of the UV absorber include benzophenone-based, benzoate-based, benzotriazole-based, salicylate-based, substituted tolyl-based and metal chelate-based compounds and the like. Of these, benzotriazole-based one is particularly preferable, and trade name Tinuvin P, Tinuvin 213, Tinuvin 234, Tinuvin 326, Tinuvin 327, Tinuvin 328, Tinuvin 329, and Tinuvin 571 (each of the above manufactured by BASF) can be mentioned. Particularly preferred is a 2-(2H-1,2,3-benzotriazol-2-yl)-phenol-based compound. Furthermore, a combined use of a phenol-based or hindered phenol-based antioxidant, and a hindered amine-based light stabilizer, and a benzotriazole-based UV absorber is preferable. One or more kinds of UV absorber can be used.

The amount of the UV absorber to be used is preferably 0.1-10 parts by weight, particularly preferably 0.2-5 parts by weight, relative to 100 parts by weight of component (A).

In one or more embodiments, the curable composition of the present invention may contain a physical property modifier, as necessary, that controls the tensile property of the obtained cured product. While the physical property modifier is not particularly limited, for example, alkylalkoxysilanes such as phenoxytrimethylsilane, methyltrimethoxysilane, dimethyldimethoxysilane, trimethylmethoxysilane, n-propyltrimethoxysilane and the like; arylalkoxysilanes such as diphenyldimethoxysilane, phenyltrimethoxysilane and the like; alkylisopropenoxysilanes such as dimethyldiisopropenoxysilane, methyltriisopropenoxysilane, γ-glycidoxypropylmethyldiisopropenoxysilane and the like; trialkylsilyl borates such as tris(trimethylsilyl) borate, tris(triethylsilyl) borate and the like; silicone varnishes; polysiloxanes and the like can be mentioned. By using such property controlling agent, the hardness of the composition of the present invention upon curing may be increased, or conversely decreased to increase elongation at break. One or more kinds of such property controlling agent can be used.

As a property controlling agent, a compound that produces a compound having a monovalent silanol group in a molecule by hydrolysis can be used. Such compound has an action to decrease modulus of a cured product without worsening the stickiness of the surface of the cured product, and a compound that produces trimethylsilanol is particularly preferable. As a compound that produces a compound having a monovalent silanol group in a molecule by hydrolysis, a compound described in JP-A-5-117521 can be mentioned. In addition, a compound that produces a silicon compound that produces $R_3SiOH$ such as trimethylsilanol and the like by hydrolysis, which is a derivative of an alkyl alcohol such as hexanol, octanol, decanol or the like, a compound that produces a silicon compound that produces $R_3SiOH$ such as trimethylsilanol and the like by hydrolysis, which is a derivative of a polyvalent alcohol having not less than 3 hydroxy groups, such as trimethylolpropane, glycerol, pentaerythritol, sorbitol or the like as described in JP-A-11-241029 can be mentioned. One or more kinds of such property controlling agent can be used.

As a property controlling agent, a compound that produces a silicon compound that produces $R_3SiOH$ such as trimethylsilanol and the like by hydrolysis, which is a derivative of an oxypropylene polymer as described in JP-A-7-258534 can also be mentioned. Furthermore, a polyoxypropylene polymer having a crosslinkable hydrolyzable silicon-containing group and a silicon-containing group, which can be a monosilanol-containing compound by hydrolysis as described in JP-A-6-279693 can also be used. One or more kinds of such property controlling agent can be used.

In one or more embodiments of the present invention, a tackifier resin can be added as necessary to enhance adhesiveness and close adhesiveness to a substrate or for other purposes. As a tackifier resin, known tackifier resins can be used without limitation. Specific examples thereof include terpene-based resin, aromatic modified terpene resin, hydrogenated terpene resin obtained by hydrogenating same, terpene-phenol resin obtained by copolymerizing terpenes with phenols, phenol resin, modified phenol resin, xylene-phenol resin, cyclopentadiene-phenol resin, coumarone-indene resin, rosin resin, rosin ester resin, hydrogenated rosin ester resin, xylene resin, low-molecular weight polystyrene-based resin, styrene copolymer resin, petroleum resin (e.g., C5 hydrocarbon resin, C9 hydrocarbon resin, C5C9 hydrocarbon copolymer resin etc.), hydrogenated petroleum resin, DCPD resin and the like. As the styrene copolymer resin, a styrene-based block copolymer or a hydrogenated product thereof is preferable. The styrene-based block copolymer and hydrogenated product thereof are not particularly limited, and examples thereof include styrene-butadiene-styrene block copolymer (SBS), styrene-isoprene-styrene block copolymer (SIS), styrene-ethylenebutylene-styrene block copolymer (SEBS), styrene-ethylenepropylene-styrene block copolymer (SEPS), styrene-isobutylene-styrene block copolymer (SIBS) and the like. Of these, terpene-phenol resin is preferable since it shows high compatibility with polymer (A) affords highly close adhering effect. On the other hand, when color tone is important, a petroleum resin (hydrocarbon resin) is preferable.

One or more kinds of tackifier resin can be used.

The amount of a tackifier resin to be used is preferably 2-100 parts by weight, more preferably 5-50 parts by weight, further preferably 5-30 parts by weight, relative to 100 parts by weight of component (A). When the content is less than 2 parts by weight, an adhesion and close adhesion effect to a substrate is difficult to obtain, and when it exceeds 100 parts by weight, viscosity of a curable composition sometimes becomes too high and handling becomes difficult.

In one or more embodiments, an epoxy group-containing compound can be used for the composition of the present invention. By the use of an epoxy group-containing compound, the recovery property of the cured product can be increased. As an epoxy group-containing compound, epoxydized unsaturated fats and oils, epoxydized unsaturated fatty acid esters, alicyclic epoxy compounds, compounds shown as epichlorohydrin derivative and mixtures thereof and the like can be mentioned as examples. Specifically, epoxydized soy bean oil, epoxydized linseed oil, bis(2-ethylhexyl)-4,5-epoxycyclohexane-1,2-dicarboxylate (E-PS), epoxyoctyl stearate, epoxybutyl stearate and the like can be mentioned. Of these, E-PS is particularly preferable. An epoxy group-containing compound is preferably used at 0.5-50 parts by weight relative to 100 parts by weight of component (A).

In one or more embodiments, a photocurable substance can be used for the composition of the present invention. When a photocurable substance is used, a film of the photocurable substance is formed on the surface of the cured product, the stickiness and weather resistance of the cured product can be improved. The photocurable substance is one that shows chemical changes of the molecular structure in a considerably short time and produces physical changes such as curing by the action of light. As such kinds of compounds, many are known such as organic monomer, oligomer, resin, compositions containing same and the like, and any commercially available one can be employed. As representative, unsaturated acrylic compounds, polyvinyl cinnamates, azide resins and the like can be used. Examples of the unsaturated acrylic compound include monomers, oligomers or mixtures thereof, having one to several acrylic or methacrylic unsaturated groups, which are monomers such as propylene(or butylene, ethylene)glycol di(meth)acrylate, neopentylglycol di(meth)dimethacrylate and the like, or oligoesters having a molecular weight of not more than 10,000. Specific examples include special acrylate (bifunctional) Aronix M-210, Aronix M-215, Aronix M-220, Aronix M-233, Aronix M-240, Aronix M-245; (trifunctional) Aronix M305, Aronix M-309, Aronix M-310, Aronix M-315, Aronix M-320, Aronix M-325, and (multifunctional) Aronix M-400 and the like. Particularly, a compound containing an acrylic functional group is preferable, and a compound containing 3 or more, same functional groups on average in one molecule is preferable (each Aronix recited above is a product of Toagosei Co., Ltd.).

Examples of the polyvinyl cinnamate include a photosensitive resin having a cinnamoyl group as a photosensitive group, wherein polyvinyl alcohol is esterified by cinnamic acid, and many other polyvinyl cinnamate derivatives. An azide resin is known to be a photosensitive resin containing an azido group as a photosensitive group, and it is generally a rubber photosensitive liquid containing a diazide compound as a photosensitizer. Detailed examples are disclosed in "Photosensitive Resin" (Insatsu Gakkai Shuppanbu Ltd., page 93-, page 106-, page 117-, Mar. 17, 1972), and these can be used singly or mixed and added with a sensitizer as necessary and used. When a sensitizer such as ketones, nitro compounds and the like or a promoter such as amines and the like is added, the effect is sometimes enhanced. A photocurable substance is preferably used at 0.1-20 parts by weight, preferably 0.5-10 parts by weight, relative to 100 parts by weight of component (A). When it is not more than 0.1 part by weight, a weatherability-enhancing effect is absent, and when it is not less than 20 parts by weight, the cured product becomes too stiff and cracks tend to occur.

In one or more embodiments, the composition of the present invention can contain an oxygen curable substance. As the oxygen curable substance, an unsaturated compound reactive with oxygen in the air can be mentioned as an example. It reacts with oxygen in the air, forms a cured film near the surface of the cured product and prevents stickiness of the surface and attachment of dust and dirt to the surface of the cured product. Specific examples of the oxygen curable substance include dry oils represented by tung oil, linseed oil and the like, various alkyd resins obtained by modifying said compound; acrylic polymer, epoxy resin and silicone resin, each modified by dry oil; liquid polymers such as 1,2-polybutadiene, 1,4-polybutadiene, C5-C8 diene polymer and the like obtained by polymerization or copolymerization of diene compounds such as butadiene, chloroprene, isoprene, 1,3-pentadiene and the like; liquid copolymers such as NBR, SBR and the like obtained by copolymerization of diene compounds and monomers such as acrylonitrile, styrene and the like, which are copolymerizable with these diene compounds, such that the diene compound becomes the main component, modified products thereof (maleic modified products, boil oil modified products and the like) and the like. They may be used alone, or two or more kinds thereof may be used in combination. Of these, tung oil and liquid diene polymer are particularly preferable. In addition, a combined use of a catalyst promoting the oxidation curing reaction or a metal dryer may enhance the effect thereof. As such catalyst and metal dryer, metal salts such as cobalt naphthenate, lead naphthenate, zirconium naphthenate, cobalt octylate, zirconium octylate and the like, amidine compounds and the like can be mentioned as examples. The amount of the oxygen curable substance to be used is preferably 0.1-20 parts by weight, further preferably 0.5-10 parts by weight, relative to 100 parts by weight of component (A). When the aforementioned amount is less than 0.1 part by weight, improvement of staining becomes insufficient, and when it exceeds 20 parts by weight, the tensile property and the like of the cured product tend to be impaired. As described in JP-A-3-160053, the oxygen curable substance is preferably used in combination with a photocurable substance.

In one or more embodiments, the composition of the present invention can contain an epoxy resin. A curable composition containing an epoxy resin is particularly preferable as an adhesive, especially an adhesive for exterior wall tiles. Examples of the epoxy resin include, but are not limited to, flame-retardant epoxy resins such as epichlorohydrin-bisphenol A epoxy resin, epichlorohydrin-bisphenol F epoxy resin, tetrabromobisphenol A glycidyl ether and the like, novolac epoxy resin, hydrogenated bisphenol A epoxy resin, glycidyl ether epoxy resin of bisphenol A propylene oxide addition product, p-oxybenzoic acid glycidyl ether ester epoxy resin, m-aminophenol-based epoxy resin, diaminodiphenylmethane-based epoxy resin, urethane modified epoxy resin, various kinds of alicyclic epoxy resins, N,N-diglycidyl aniline, N,N-diglycidyl-o-toluidine, triglycidyl isocyanurate, polyalkylene glycol diglycidyl ether, glycidyl ethers of polyvalent alcohol such as glycerol and the like, hydantoin epoxy resin, epoxy product of unsaturated polymers such as petroleum resin and the like, and the like. Conventional epoxy resins can be used. One containing at least two epoxy groups in a molecule is preferable, since it shows high reactivity during curing, and a cured product easily forms a three-dimensional network and the like. More preferred are bisphenol A type epoxy resins or novolac epoxy resin and the like. The ratio (weight ratio) of these epoxy resins to be used is polymer (A)/epoxy resin=100/1-1/100. When the ratio of polymer (A)/epoxy resin is less than 1/100, an improving effect on the impact strength and toughness by the epoxy resin cured product is difficult to obtain, and when the ratio of polymer (A)/epoxy resin exceeds 100/1, the strength of the polymer cured product becomes insufficient. A preferable use ratio cannot be determined automatically since it varies depending on the use of a curable resin composition and the like. For example, the polymer is preferably used at 1-100 parts by weight, further preferably 5-100 parts by weight, relative to 100 parts by weight of epoxy resin, when the impact resistance, flexibility, toughness, peel strength and the like of an epoxy resin cured product are to be improved. On the other hand, when the strength of the cured product is improved, an epoxy resin is preferably used at 1-200 parts by weight, further preferably 5-100 parts by weight, relative to 100 parts by weight of component (A).

In one or more embodiments, when an epoxy resin is added, the composition of the present invention can contain a curing agent for curing the epoxy resin for combined use. A usable curing agent for epoxy resin is not particularly limited, and a conventionally-used curing agent for epoxy resin can be used. Specific examples thereof include, but are not limited to, primary or secondary amines such as triethylenetetramine, tetraethylenepentamine, diethylaminopropylamine, N-aminoethylpiperidine, m-xylylenediamine, m-phenylenediamine, diaminodiphenylmethane, diaminodiphenylsulfone, isophoronediamine, amine terminal polyether and the like; tertiary amines such as 2,4,6-tris(dimethylaminomethyl)phenol, tripropylamine and the like, and salts of these tertiary amines; polyamide resins; imidazoles; dicyanodiamides; boron trifluoride complex compounds; carboxylic anhydrides such as phthalic anhydride, hexahydrophthalic anhydride, tetrahydrophthalic anhydride, dodecinyl succinic anhydride, pyromellitic anhydride, chlorendic anhydride and the like; alcohols; phenols; carboxylic acids; compounds such as diketone complex compound of aluminum or zirconium and the like. The curing agent may be used alone, or two or more kinds thereof may be used in combination. When a curing agent for epoxy resin is used, the amount thereof to be used is preferably 0.1-300 parts by weight per 100 parts by weight of the epoxy resin.

As a curing agent for epoxy resin, a ketimine can be used. The ketimine is stably present in a state free of moisture, and decomposed into a primary amine and a ketone by reacting with moisture, and the resulting primary amine is a room temperature-curable curing agent for epoxy resin. Use of a ketimine affords a one-component composition. Such ketimine can be obtained by the condensation reaction of an amine compound and a carbonyl compound.

For the synthesis of a ketimine, a known amidine and a known carbonyl compound may be used. For example, as the amidine compound, diamines such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine, p,p'-biphenylenediamine and the like; polyvalent amines such as 1,2,3-triaminopropane, triaminobenzene, tris(2-aminoethyl)amine, tetra(aminomethyl)methane and the like; polyalkylenepolyamines such as diethylenetriamine, triethylenetriamine, tetraethylenepentamine and the like; polyoxyalkylene-based polyamines; aminosilanes such as γ-aminopropyltriethoxysilane, N-(β-aminoethyl)-γ-aminopropyltrimethoxysilane, N-(β-aminoethyl)-γ-aminopropylmethyldimethoxysilane and the like; and the like can be used. As the carbonyl compound, aldehydes such as acetaldehyde, propionaldehyde, n-butylaldehyde, isobutylaldehyde, diethylacetoaldehyde, glyoxal, benzaldehyde and the like; cyclic ketones such as cyclopentanone, trimethylcyclopentanone, cyclohexanone, trimethylcyclohexanone and the like; aliphatic ketones such as acetone, methyl ethyl ketone, methyl propyl ketone, methyl isopropyl ketone, methyl isobutyl ketone, diethyl ketone, dipropyl ketone, diisopropyl ketone, dibutyl ketone, diisobutyl ketone and the like; β-dicarbonyl compounds such as acetylacetone, methyl acetoacetate, ethyl acetoacetate, dimethyl malonate, diethyl malonate, methyl ethyl malonate, dibenzoylmethane and the like; and the like can be used.

When an imino group is present in a ketimine, the imino group may be reacted with styrene oxide; glycidyl ethers such as butylglycidyl ether, allyl glycidyl ether and the like; glycidyl esters and the like. The ketimine may be used alone, or two or more kinds thereof may be used in combination. It is used at 1-100 parts by weight per 100 parts by weight of the epoxy resin, where the amount to be used varies depending on the kind of the epoxy resin and the ketimine.

In one or more embodiments, the curable composition of the present invention can contain a flame-retardant such as a phosphorus flame-retardant such as ammonium polyphosphate, tricresyl phosphate and the like, and aluminum hydroxide, magnesium hydroxide, and thermally expandable black lead and the like. The above-mentioned flame-retardant may be used alone, or two or more kinds thereof may be used in combination.

A flame-retardant is preferably used at 5-400 parts by mass, preferably 50-200 parts by mass, relative to 100 parts by weight of component (A).

In one or more embodiments, the curable composition of the present invention may contain various additives as necessary to adjust various properties of a curable composition or a cured product. Examples of such additives include radical inhibitor, metal deactivator, antiozonant, phosphorus peroxide decomposer, lubricant, pigment, foaming agent, solvent, fungicide and the like. These various additives may be used alone, or two or more kinds thereof may be used in combination. Specific examples other than the specific examples of the additives indicated in the present specification are described in, for example, JP-B-4-69659, JP-B-7-108928, JP-A-63-254149, JP-A-64-22904, JP-A-2001-72854 and the like.

In one or more embodiments, the curable composition of the present invention can also be prepared as a one-component type to be cured by moisture in the air after application by previously blending all components to be blended, and preserving same after tightly sealing. It is also possible to separately blend components such as a curing catalyst, a filler, a plasticizer, water and the like as a curing agent, and prepare a two-component type wherein the curing agent and a polymer composition are mixed before use.

When the curable composition is a one-component type, all components to be blended are blended in advance. Therefore, components containing moisture to be blended are preferably dehydrated and dried before use, or dehydrated during kneading under reduced pressure and the like. When the above-mentioned curable composition is a two-component type, a curing catalyst does not need to be added to a main agent containing a polymer having a reactive silicon group. Therefore, even when components to be blended contain some moisture, gelation is not feared; however, when storage stability over a long term is necessary, components to be blended are preferably dehydrated and dried. In the case of a solid such as powder and the like, a dehydrating and drying method is preferably a heat drying method and, in the case of liquid, a dehydrating and drying method is preferably a reduced pressure dehydrating method, or a dehydrating method using synthetic zeolite, activated alumina, silica gel and the like. In addition, it is possible to perform dehydration by adding a small amount of an isocyanate compound to the components to be blended to allow for a reaction of the isocyanate group and water. The storage stability is further improved by adding lower alcohols such as methanol, ethanol and the like; alkoxysilane compounds such as n-propyltrimethoxysilane, vinyltrimethoxysilane, vinylmethyldimethoxysilane, γ-mercaptopropylmethyldimethoxysilane, γ-mercaptopropylmethyldiethoxysilane, γ-glycidoxypropyltrimethoxysilane and the like in addition to the dehydrating and drying method.

The amount of a dehydrating agent (particularly a silicon compound capable of reacting with water such as vinyltrimethoxysilane and the like) to be used is preferably 0.1-20 parts by weight, particularly preferably 0.5-10 parts by weight relative to 100 parts by weight of component (A).

The production method of the curable composition of the present invention is not particularly limited, and a conventional method such as a method including blending the above-mentioned components, kneading the mixture in a mixer, roll, kneader and the like at ambient temperature or a method including dissolving the above-mentioned components in a small amount of a solvent and mixing same can be adopted.

In one or more embodiments, the curable composition of the present invention can be used as a pressure-sensitive adhesive, a sealing material for structures, boats and ships, automobiles, roads and the like, adhesive, pattern-making agent, vibration-proof material, damping material, acoustic insulation, foamed material, paint, spraying material, coating film waterproofing agent and the like. A cured product obtained by curing the curable composition of the present invention shows good water-resistant adhesiveness. Therefore, it is more preferably used as a sealing material or an adhesive, further preferably as a woodworking adhesive, from among these.

In addition, it can be used for various uses including electric or electronic component materials such as solar battery rear surface sealant and the like, electrical insulating materials such as insulation covering material for electric wire or cable and the like, elastic adhesive, contact-type adhesive, spray-type sealing material, crack repairing material, tiling adhesive, powder coating, casting material, medical rubber material, medical adhesive, medical equipment sealing material, food packaging material, joint sealing material for jacket material such as sizing board and the like, coating material, primer, conductive material for shielding electromagnetic wave, thermally conductive material, hot melt material, electric or electronic potting agent, film, gasket, various molding material, as well as rustproof or waterproof sealing material for wire glass or laminate glass end surface (cut section), liquid sealant used for automobile parts, electric parts, various machine components and the like, and the like. Moreover, since it can be closely adhered to a wide range of substrates such as glass, porcelain, wood, metal, resin molded products and the like by itself or with the aid of a primer, it can also be used as various types of tight-sealing composition or adhesive composition. Furthermore, in one or more embodiments, the curable composition of the present invention can be used as adhesive for interior panels, adhesive for exterior panels, tiling adhesive, stone finishing adhesive, ceiling finishing adhesive, floor finishing adhesive, wall finishing adhesive, vehicle paneling adhesive, adhesive for assembly of electric or electronic or precision equipments, sealing material for direct glazing, multi-layer glass sealing material, sealing material for SSG method, or sealing material for structure working joints.

EXAMPLES

While the present invention is explained in more detail in the following by referring to Examples, the present invention is not limited by the following Examples.

Synthetic Example 1

Using polyoxypropylene triol having a number average molecular weight of about 3,000 as an initiator, propylene-oxide was polymerized by a zinc hexacyanocobaltate glyme complex catalyst to give polyoxypropylene triol having a number average molecular weight of 26,000. Then, a solution of NaOMe (sodium methoxide) (1.2 equivalents relative to a hydroxyl group of the hydroxyl group terminal polyoxypropylene triol) in methanol was added and methanol was evaporated. 3-Chloro-1-propene (1.2 equivalents relative to the hydroxyl group) was added to convert the terminal hydroxyl group to an allyl group. To the obtained allyl group terminal polyoxypropylene (500 g) was added platinum divinyldisiloxane complex (3 wt % isopropanol solution based on platinum) (50 μl), and TES (triethoxysilane) (8.5 g) was slowly added dropwise with stirring. The mixed solution was reacted at 90° C. for 2 hr, and unreacted TES was evaporated under reduced pressure. Furthermore, methanol (100 g) and HCl (12 ppm) were added to convert the terminal ethoxy group to a methoxy group at 90° C. to give reactive silicon group-containing polyoxypropylene polymer (A-1) containing a trimethoxysilyl group on the terminal and 2.0 silicon groups on average per 1 molecule.

Synthetic Example 2

Isobutanol (51.1 parts by weight) was placed in a four-mouthed flask provided with a stirring machine, and the temperature was raised under a nitrogen atmosphere to 105° C. A mixed solution of methyl methacrylate (65.0 parts by weight), 2-ethylhexyl acrylate (25.0 parts by weight), 3-methacryloxypropyltrimethoxysilane (10.0 parts by weight), 3-mercaptopropyltrimethoxysilane (8.0 parts by weight), and 2,2'-azobis(2-methylbutyronitrile) (2.5 parts by weight) in isobutanol (22.7 parts by weight) was added dropwise thereto over 5 hr. Polymerization was performed at 105° C. for 2 hr to give an isobutanol solution (solid content 60%) of reactive silicon group-containing (meth)acrylic polymer (A-2) having 1.6 silicon groups on average per 1 molecule and a number average molecular weight of 2,100.

Examples 1-4, Comparative Examples 1-4

The reactive silicon group-containing polyoxypropylene polymer (60.0 parts by weight) obtained in Synthetic Example 1 and an isobutanol solution (66.7 parts by weight) of the reactive silicon group-containing (meth)acrylic polymer obtained in Synthetic Example 2 were mixed, isobutanol was evaporated under reduced pressure to give reactive silicon group-containing organic polymer (A) having a polymer weight ratio (A-1)/(A-2)=60/40.

Respective components shown in the following Table 1 were mixed at the amounts shown in the following Table to give a curable composition. In the Table, numerical values other than the test results are in parts by weight.

Using the thus-obtained curable compositions, the following adhesiveness evaluation was performed. The results are shown in Table 1.

(Initial Shear Strength)

Beechwood (3 mm×25 mm×100 mm) was used as an adherend and, as a pre-treatment, the surface was smoothed with P100 sandpaper. A curable composition as an adhesive was applied to the beechwood by using Sellotape (No. 405) manufactured by NICHIBAN at a thickness of 50 μm over the area of 25×10 mm. With an open time being 0 min, an adherend was adhered immediately after application and fixed with a bulldog clip (manufactured by KOKUYO, width 20 mm). Thereafter, it was aged under 23° C. 50% RH conditions for 1 week. Then, a tensile test was performed by AR-5422 manufactured by Shimadzu Corporation. The test speed was 50 mm/min.

(Shear Strength After Water-Resistant Test)

Industrial water (about 20 L) was placed in a metal container (about 50 cm×40 cm×height 40 cm), and the adherend produced and fixed with the clip as mentioned above was immersed in water at room temperature. The adherend was stood in this state for 4 days and a tensile test was performed by AR-5422 manufactured by Shimadzu Corporation. The test speed was 50 mm/min.

TABLE 1

|  |  | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|---|
| polymer | organic polymer A | 100 | 100 | 100 | 100 | 100 | 100 | 100 | 100 |
| bound substance of kaolinite and quartz (calcined) | Aktifit VM | 50 | 100 |  | 100 |  |  |  |  |
| bound substance of kaolinite and quartz (uncalcined) | Sillitin Z-86 |  |  | 100 |  |  |  |  |  |
| kaolin | ASP-170 |  |  |  |  |  | 50 |  |  |
| calcium carbonate | C110S |  |  |  |  |  |  | 50 | 100 | 100 |
| dehydrating agent | A-171 | 5 | 6.7 | 6.7 | 6.7 | 5 | 5 | 6.7 | 6.7 |
| MS curing catalyst | S-1 | 1 | 0.1 | 0.1 | 0.3 | 1 | 1 | 0.1 | 0.3 |
| amidine compound | DBU |  | 2 | 2 |  |  |  | 2 |  |
| epoxy silane | A-187 | 5 | 4 | 4 |  | 5 | 5 | 4 |  |
| aminosilane | A-1120 |  | 2 | 2 | 2 |  |  | 2 | 2 |
| epoxy resin | JER 828 | 20 |  |  |  | 20 | 20 |  |  |
| epoxy curing agent | H-30 | 13.8 |  |  |  | 13.8 | 13.8 |  |  |
| antioxidant | IRGANOX 1010 | 1 | 1 | 1 | 1 | 1 | 1 | 1 | 1 |
| initial shear strength (MPa) |  | 13.83 | 9.75 | 7.65 | 9.64 | 11.48 | 12.11 | 4.55 | 5.69 |
| shear strength (MPa) after water-resistant test |  | 3.27 | 4.26 | 3.76 | 3.32 | 2.29 | 2.26 | 3.67 | 2.69 |

In Table 1, each additive was as follows.

Aktifit VM: vinylsilane-treated calcined Sillitin (kaolinite content: 10 wt %, $D_{50}$ particle size: 2.0 μm) manufactured by Hoffmann Mineral Sillitin Z-86: uncalcined Sillitin (kaolinite content: 30 wt %, $D_{50}$ particle size: 1.9 μm) manufactured by Hoffmann Mineral ASP-170: kaolin manufactured by BASF C110S: surface-treated ground calcium carbonate manufactured by Imerys A-171: vinyltrimethoxysilane manufactured by Momentive S-1: dioctyltin compound manufactured by NITTO KASEI DBU: 1,8-diazabicyclo[5.4.0]undec-7-ene manufactured by Tokyo Chemical Industry A-187: γ-glycidoxypropyltrimethoxysilane manufactured by Momentive A-1120: N-β-aminoethyl-γ-aminopropyltrimethoxysilane manufactured by Momentive JER 828: bisphenol A type epoxy resin manufactured by Mitsubishi Chemical Corporation H-30: ketimine manufactured by Mitsubishi Chemical Corporation IRGANOX 1010: hindered phenol-based antioxidant manufactured by BASF A comparison of Example 1 and Comparative Examples 1, 2 reveals that a curable composition containing a bound substance of kaolinite and quartz shows good shear strength even after the water-resistant test. This shows that a firm intermolecular force acts between the curable composition of Example 1 and the wood, and maintains adhesiveness even after the water-resistant test. In addition, a comparison of Examples 2 and 3 reveals that a calcined product (component (B)) having a kaolinite content of not more than 15% is superior in the initial shear strength, and shear strength after water-resistant test.

This application is based on a patent application No. 2014-010525 filed in Japan, the contents of which are incorporated in full herein.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A curable composition comprising:
   an organic polymer containing a reactive silicon group (A), and
   a bound substance of kaolinite and quartz (B) at a proportion of 30-200 parts by weight relative to 100 parts by weight of the organic polymer containing a reactive silicon group (A);
   wherein the bound substance of kaolinite and quartz (B) is calcined.

2. The curable composition according to claim 1, wherein the organic polymer containing a reactive silicon group (A) comprises a reactive silicon group-containing polyoxyalkylene-based polymer (A1) and/or a reactive silicon group-containing (meth)acrylate-based polymer (A2).

3. The curable composition according to claim 1, wherein the organic polymer containing a reactive silicon group (A) comprises a polyoxyalkylene-based polymer (a1) and/or a (meth)acrylate-based polymer (a2) as a main chain skeleton.

4. The curable composition according to claim 1, wherein the bound substance of kaolinite and quartz (B) has a kaolinite content of not more than 15 wt %.

5. The curable composition according to claim 1, wherein the bound substance of kaolinite and quartz (B) has a $D_{50}$ particle size of 1-3 μm.

6. The curable composition according to claim 1, wherein the bound substance of kaolinite and quartz (B) is surface-treated.

7. The curable composition according to claim 1, further comprising an epoxy group-containing silane coupling agent (C) and an amidine compound (D).

8. The curable composition according to claim 1, further comprising an organotin-based compound.

9. An adhesive comprising the curable composition according to claim 1.

10. A cured product obtained by curing the curable composition according to claim 1.

11. An adhered structure of wood and a cured product obtained by curing the curable composition according to claim 1.

12. The curable composition according to claim 1, wherein the organic polymer containing a reactive silicon group (A) comprises a reactive silicon group-containing polyoxyalkylene-based polymer (A1) and a reactive silicon group-containing (meth)acrylate-based polymer (A2).

13. The curable composition according to claim 12, wherein the reactive silicon group-containing polyoxyalkylene-based polymer (A1) contains a polyoxyalkylene-based polymer (a1) as a main chain skeleton; the reactive silicon group-containing (meth)acrylate-based polymer (A2) contains a (meth)acrylate-based polymer (a2) as a main chain skeleton; and a weight ratio of the polyoxyalkylene-based polymer (a1) and the (meth)acrylate-based polymer (a2) ((a1)/(a2)) is 20/80-90/10.

14. The curable composition according to claim 13, wherein the weight ratio of the polyoxyalkylene-based polymer (a1) and the (meth)acrylate-based polymer (a2) ((a1)/(a2)) is 30/70-80/20.

15. The curable composition according to claim 13, wherein the weight ratio of the polyoxyalkylene-based polymer (a1) and the (meth)acrylate-based polymer (a2) ((a1)/(a2)) is 40/60-70/30.

* * * * *